US011937198B2

(12) United States Patent
Mladin et al.

(10) Patent No.: US 11,937,198 B2
(45) Date of Patent: Mar. 19, 2024

(54) 5G DELAY TOLERANT DATA SERVICES

(71) Applicant: InterDigital Patent Holdings, Inc., Wilmington, DE (US)

(72) Inventors: Catalina Mihaela Mladin, Hatboro, PA (US); Michael F. Starsinic, Newtown, PA (US); Hongkun Li, Malvern, PA (US); Rocco Di Girolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 72 days.

(21) Appl. No.: 17/257,140

(22) PCT Filed: Jul. 2, 2019

(86) PCT No.: PCT/US2019/040309
§ 371 (c)(1),
(2) Date: Dec. 30, 2020

(87) PCT Pub. No.: WO2020/010088
PCT Pub. Date: Jan. 9, 2020

(65) Prior Publication Data
US 2021/0127343 A1    Apr. 29, 2021

Related U.S. Application Data

(60) Provisional application No. 62/693,108, filed on Jul. 2, 2018.

(51) Int. Cl.
*H04W 56/00* (2009.01)
*H04W 4/70* (2018.01)
(Continued)

(52) U.S. Cl.
CPC .......... *H04W 56/003* (2013.01); *H04W 4/70* (2018.02); *H04W 76/11* (2018.02); *H04W 76/14* (2018.02); *H04W 88/04* (2013.01)

(58) Field of Classification Search
CPC ..... H04W 56/003; H04W 4/70; H04W 76/11; H04W 76/14; H04W 88/04
See application file for complete search history.

(56) References Cited

U.S. PATENT DOCUMENTS

2008/0310324 A1* 12/2008 Chaponniere ......... H04L 47/245
370/254
2013/0230035 A1*  9/2013 Grandhi ................ H04W 48/20
370/338

(Continued)

FOREIGN PATENT DOCUMENTS

CN    104581648 A    4/2015
CN    107005782 A    8/2017

(Continued)

OTHER PUBLICATIONS

Adachi et al., "Communications Equipment and Communication Control Program", Sep. 14, 2006, JP, English translation of JP 2006246539 (Year: 2006).*

(Continued)

*Primary Examiner* — Michael K Phillips
(74) *Attorney, Agent, or Firm* — Flaster Greenberg P.C.

(57) ABSTRACT

Methods and apparatuses are described herein for a 5G system that deploys services providing optimizations and value add services based on delay tolerant data (DTD) exchanges between end devices and machine to machine (M2M) servers. In accordance with one embodiment, an apparatus may receive, from a second apparatus via the network, first information comprising a delay tolerant communication configuration comprising an identifier and a delay tolerant characteristic. The apparatus may receive, from a third apparatus, data in a plurality of data bundles that each comprises the identifier. The apparatus may process, based on the first information, the plurality of data bundles.

(Continued)

The apparatus may route, based on the first information, the plurality of data bundles. The third apparatus may comprise a user equipment (UE).

20 Claims, 22 Drawing Sheets

(51) Int. Cl.
*H04W 76/11* (2018.01)
*H04W 76/14* (2018.01)
*H04W 88/04* (2009.01)

(56) References Cited

U.S. PATENT DOCUMENTS

| | | | |
|---|---|---|---|
| 2014/0032730 A1* | 1/2014 | Fall | H04L 67/02 |
| | | | 709/223 |
| 2014/0286256 A1* | 9/2014 | Chowdhury | H04L 47/2416 |
| | | | 370/328 |
| 2016/0135171 A1 | 5/2016 | Korhonen et al. | |
| 2016/0174205 A1 | 6/2016 | Maaref et al. | |
| 2016/0242230 A1* | 8/2016 | Huang | H04W 52/0258 |
| 2016/0381523 A1 | 12/2016 | Baghel et al. | |
| 2017/0041752 A1 | 2/2017 | Baek et al. | |
| 2017/0208503 A1* | 7/2017 | Ono | H04L 67/34 |
| 2017/0272361 A1 | 9/2017 | Speight | |
| 2017/0289025 A1 | 10/2017 | Cheng et al. | |
| 2017/0295104 A1* | 10/2017 | Hampel | H04W 48/18 |
| 2017/0295598 A1* | 10/2017 | Hampel | H04W 88/06 |
| 2017/0339622 A1* | 11/2017 | Condeixa | H04L 67/63 |
| 2017/0373979 A1* | 12/2017 | Speight | H04W 84/18 |
| 2018/0020390 A1 | 1/2018 | Park et al. | |
| 2018/0063749 A1* | 3/2018 | Islam | H04L 1/1893 |
| 2018/0063860 A1* | 3/2018 | Yeung | H04W 4/70 |
| 2018/0063865 A1* | 3/2018 | Islam | H04W 72/23 |
| 2018/0092020 A1* | 3/2018 | Torres | H04L 45/021 |
| 2018/0219789 A1* | 8/2018 | Chaudhuri | H04L 47/31 |
| 2018/0359626 A1* | 12/2018 | Benoliel | H04W 72/20 |
| 2019/0124589 A1* | 4/2019 | Bogineni | H04W 36/32 |

FOREIGN PATENT DOCUMENTS

| | | | | |
|---|---|---|---|---|
| CN | 107820712 A | 3/2018 | | |
| CN | 107852637 A | 3/2018 | | |
| EP | 2906011 A2 | 8/2015 | | |
| JP | 2006246539 A | * 9/2006 | | H04L 1/1614 |
| WO | WO-2017220248 A1 | * 12/2017 | | H04W 28/10 |
| WO | 2018/093221 A1 | 5/2018 | | |

OTHER PUBLICATIONS

NEC, "Key Issue #5 Solution: Paging for delay tolerant applications in the UE", SA WG2 Meeting #127bis, S2-184718, May 2018, pp. 1-3.

* cited by examiner

5G DELAY TOLERANT DATA SERVICES

CROSS-REFERENCE TO RELATED APPLICATIONS

This application is the National Stage of International Patent Application No. PCT/US2019/040309, filed Jul. 2, 2019, which claims the benefit of U.S. Provisional Patent Application No. 62/693,108, filed Jul. 2, 2018, which are hereby incorporated by reference in their entirety.

BACKGROUND

Internet of Things (IoT) devices may sometimes send information that is delay tolerant in terms of how long the data may take to the get to the service capability server (SCS). In systems where low cost IoT devices communicate with one or more machine to machine (M2M) servers using relays, data senders may not immediately know when and if their data has reached the destination and may not always know the best relay to which to forward their data. This may result in duplicate copies of the data being sent toward the destination. Further, the same data bundle may be transmitted to multiple relays, resulting in multiple copies that only the endpoints are able to resolve. Until arriving at the endpoint, these copies use network resources unnecessarily. If only a single copy is sent from the end sensor, delivery to the endpoint is less likely to be successful. There may be no information available within the network (other than at the SCS) that allows other nodes to eliminate duplicates. As a result, network resources are wasted.

Accordingly, there is a need for optimizing network resources when processing delay tolerant data (DTD)) traffic and to communicate DTD information in order to identify delay tolerant traffic and provide services based on the unique characteristics of this traffic.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for a 5G system that deploys services providing optimizations and value add services based on delay tolerant data (DTD) exchanges between end devices and machine to machine (M2M) servers. Remote user equipments (UEs) or capillary devices may exchange DTD with M2M servers, often via relays. Services in the 5G core network and relays may recognize the delay tolerant traffic and provide reliable delivery, path optimization, prioritization, and other value-add functionality.

In accordance with one embodiment, an apparatus may receive, from a second apparatus via the network, first information comprising a delay tolerant communication configuration comprising an identifier and a delay tolerant characteristic. The apparatus may receive, from a third apparatus, data in a plurality of data bundles that each comprises the identifier. The apparatus may process, based on the first information, the plurality of data bundles. The apparatus may route, based on the first information, the plurality of data bundles. The third apparatus may comprise a user equipment (UE).

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Figure 1:
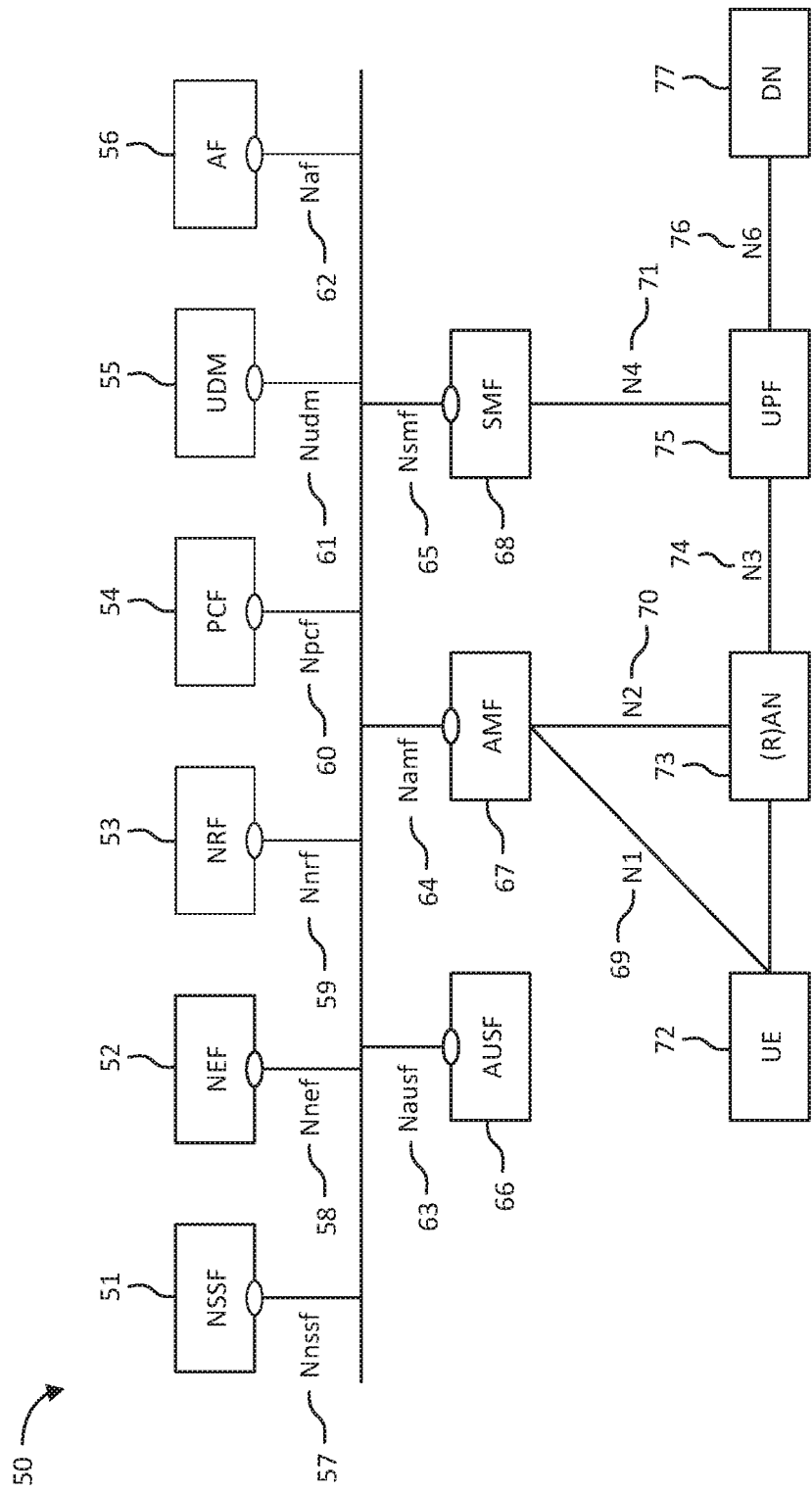
FIG. 1 is a diagram of an example non-roaming reference architecture for a 5G system with service-based interfaces in the control plane.

Methods and apparatuses are described herein for delay tolerant delay services (DTDS). The methods and apparatuses described herein are directed to enablers for delay tolerant data (DTD) processing via DTDtags associated with DTD bundles and a DTDS that is implemented within the 5G core network (5GC) (e.g., via DTDS@CN) and in the relays (e.g., via DTDS@UE). Methods for DTDS@CN and DTDS@UE configuration and initialization, methods for DTD UL and DL delivery, and methods to deliver value-add delay tolerant services are also described herein.

Internet of Things (IoT) devices may send information that is delay tolerant in terms of how long the data may take to the get to a Service Capability Server (SCS). In order to optimize network resources, an SCS should be able to tell the core network (CN) if a data source is delay tolerant. When UL DTD is sent via relays, the network may receive duplicate information. If the relays go in-and-out of coverage, acknowledgements of the end-to-end data delivery may not be delivered and unnecessary retransmissions may occur. The CN needs to be configured with DTD-specific information in order to identify delay tolerant traffic and provide services based on the unique characteristics of this traffic, such as: aggregation, advanced filtering and/or pre-processing close to the edge; reliability assistance through partial acknowledgements of data receipt along the communication path, error correction or transmission redundancy; assistance in data path optimizations and evaluation of communication performance; and prioritization, quality of service (QoS) and charging assistance using rules and policies associated with DTD.

As used herein the term service provider may refer to a stakeholder (e.g., a company) that is responsible for the deployment and management of an Application Server(s) (AS) and the services offered through an AS.

As used herein, the term data bundle may refer to information that is exchanged in a delay tolerant data exchange as a single unit among peer entities, irrespective of its payload type. In 5G systems, a data bundle may comprise one or more packet data unit (PDUs). A data bundle may have an identifier associated with it. If a data bundle does not have an identifier associated with it, a network node or a base station may determine if two received data bundles are the same by comparing the sender, recipient, data, a hash of the sender, a hash of the recipient, and/or a hash of the data. The data bundle identifier may be assigned by the UE and may be attached to the data bundle when it is sent to the network.

The following is a list of acronyms relating to technologies that may be used in the examples described herein:

| | |
|---|---|
| 5GC | 5G Core Network |
| AMF | Access and Mobility Management Function |
| AS | Application Server |
| CN | Core Network |
| DL | Downlink |
| DTD | Delay Tolerant Data |
| DTDS | Delay Tolerant Data Service |
| IMSI | International Mobile Subscriber Identity |
| MO | Mobile Originated |
| MT | Mobile Terminated |
| NEF | Network Exposure Function |
| NF | Network Function |
| NRF | Network Repository Function |
| PDN | Packet Data Network |
| PDU | Packet Data Unit |
| ProSe | Proximity Service |
| P-GW | PDN Gateway |
| QoS | Quality of Service |
| RAN | Radio Access Network |
| RAT | Radio Access Technology |
| relayUE | Relay UE |
| remUE | Remote UE |
| SCS | Service Capability Server |

-continued

| | |
|---|---|
| SCEF | Service Capability Exposure Function |
| SMF | Session Management Function |
| UDR | Unified Data Repository |
| UDSF | Unstructured Data Storage Function |
| UE | User Equipment |
| UL | Uplink |
| UPF | User Plane Function |
| TMGI | Temporary Mobile Group Identity |

FIG. 1 is a diagram of an example non-roaming reference architecture 50 for a 5G system with service-based interfaces in the control plane. FIG. 1 does not depict the UDSF, NEF and NRF, however all shown network functions (NFs) may interact with the UDSF, UDR, NEF and NRF. As shown in the example of FIG. 1, UE 72 has access, via Radio Access Network (RAN) 73, to Access and Mobility Management Function (AMF) 67 over N1 interface 69. Namf interface 64 is also shown. RAN 73 has access to AMF 67 via N2 interface 70. RAN 73 has access to User Plane Function (UPF) 75 via N3 interface 74. UPF 75 has access to Session Management Function (SMF) 68 via N4 interface 71. Nsmf interface 65 is also shown. UPF 75 has access to data network (DN) 77 via N6 interface 76.

The example of FIG. 1 also shows other NFs within the control plane such as Network Exposure Function (NEF) 52 and Nnef interface 58, NF Repository Function (NRF) 53 and Nnrf interface 59, Policy Control Function (PCF) 54 and Npcf interface 60, Unified Data Management (UDM) 55 and Nudm interface 61, Application Function (AF) 56 and Naf interface 62, and Authentication Server Function (AUSF) 66 and Nausf interface 63, and Network Slice Selection Function (NSSF) 51 and Nnssf interface 57. The mobility management and session management functions may be separated. A single N1 69 non-access stratum (NAS) connection may be used for both registration management and connection management and for session management-related messages and procedures for a UE. The single N1 69 termination point may be located in AMF 67, which may forward session management related NAS information to SMF 68. AMF 67 may handle the registration management and connection management part of the NAS signaling exchanged with UE 72. SMF 68 may handle the session management part of the NAS signaling exchanged with UE 72. User plane data may flow between UE 72 and UPF 75 via N3 interface 74. Control plane data between the UE and core network flows between the UE and AMF via the N1 interface 69.

In the 5GC, network slicing is a mechanism that may be used by mobile network operators in 5G to support multiple virtual networks behind the air interface, across the fixed part of a mobile operator's network, which may include both the backhaul and the core network. This may involve slicing the network into multiple virtual networks to support different RANs or different service types running across a single RAN. Network slicing may enable the operator to create networks customized to provide optimized solutions for different market scenarios which may demand diverse requirements, e.g., in the areas of functionality, performance, and isolation. A network slice instance may be made up of a set of NFs and the resources to run these NFs. Some NFs (or groups of NFs) may be shared by multiple network slice instances The 3GPP 5G network may incorporate network slicing technology. Network slicing technology may fulfill the very diverse and extreme requirements demanded by various 5G use cases (e.g., massive IoT, critical communications, and enhanced mobile broadband). Pre-5G architecture may utilize a relatively monolithic network and transport framework to accommodate a variety of services such as mobile traffic from smart phones, over-the-top content (OTT) content, feature phones, data cards, and embedded M2M devices. It is anticipated that pre-5G architecture is not flexible and scalable enough to efficiently support a wider range of business needs when each has its own specific set of performance, scalability and availability requirements. Furthermore, introduction of new network services may be made more efficient. Nevertheless, several use cases are anticipated to be active concurrently in the same operator network, thus requiring a high degree of flexibility and scalability of the 5G network.

Network slicing may enable the operator to create networks customized to provide optimized solutions for different market scenarios which may demand diverse requirements, e.g., in the areas of functionality, performance and isolation.

Figure 2:
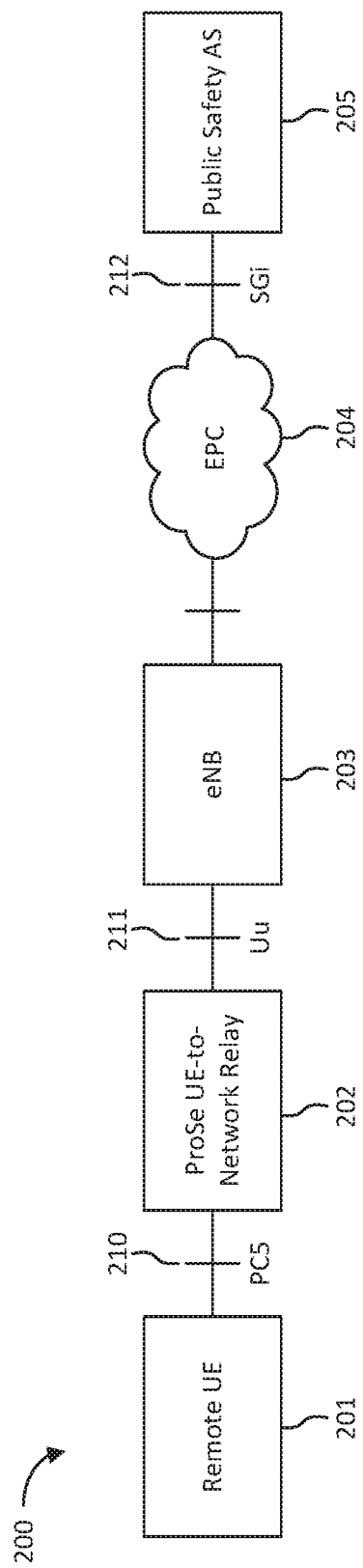
FIG. 2 is a diagram of an example architecture model using a 3GPP Proximity Service (ProSe) UE-to-network relay entity.

FIG. 2 is a diagram of an example architecture model 200 using a 3GPP Proximity Service (ProSe) UE-to-network relay entity. In the example of FIG. 2, ProSe UE-to-network relay entity 202 may provide functionality to support connectivity to the network (e.g., evolved packet core (EPC) 204) for remote UE 201, e.g., via the PC5 interface 210. ProSe UE-to-network relay entity 202 may access evolved node B (eNB) 203 via the Uu interface 211. Public safety AS 205 access EPC 204 via the SGi interface 212. ProSe UE-to-network relay 202 may relay unicast traffic (downlink (DL) and/or uplink (UL)) to/from remote UE 201. ProSe UE-to-network relay 202 may relay evolved multimedia broadcast multicast services (eMBMS) traffic using one-to-many ProSe direct communication.

Figure 3:
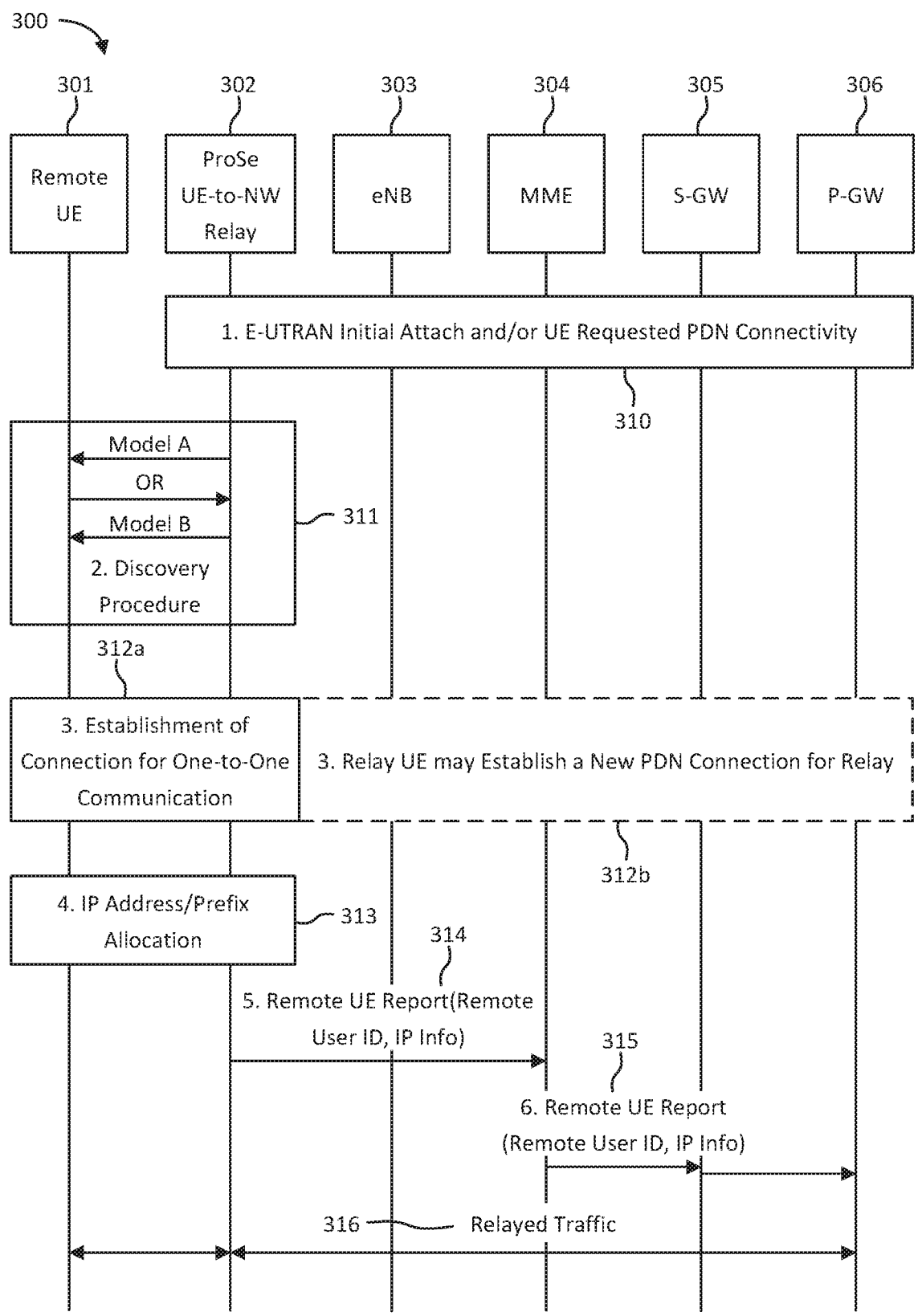
FIG. 3 is a diagram of an example procedure for direct communication via a ProSe UE-to-network relay for a remote UE.

FIG. 3 is a diagram of an example procedure 300 for direct communication via a ProSe UE-to-network relay for a remote UE. In the example of FIG. 3, a ProSe UE-to-network relay capable UE may attach to the network (if it is not already connected) and connect to a PDN connection enabling the relay traffic. Alternatively, the ProSe UE-to-network relay capable UE may connect to additional PDN connection(s) in order to provide relay traffic towards remote UE(s). PDN connection(s) supporting UE-to-network relay may only be used for remote ProSe UE(s) relay traffic. This relay feature may be used, for example, in a 3GPP public safety use case.

Referring to FIG. 3, the ProSe UE-to-Network Relay 302 may perform an initial E-UTRAN attach via eNB 303 with MME 304, S-GW 305, and P-GW 306 (if not already attached) and/or establish a PDN connection in order to provide relay traffic (if no appropriate PDN connection for this relaying exists) (step 310). Remote UE (remUE) 301 may perform discovery of a ProSe UE-to-network relay (e.g., ProSe UE-to-network relay 302) (step 311). Model A discovery or model B discovery, as defined in 3GPP, may be performed. Remote UE 301 may select a ProSe UE-to-network relay (e.g., ProSe UE-to-Network Relay 302) and establish a connection for one-to-one ProSe direct communication (step 312a). If there is no PDN connection associated with the ProSe relay UE ID or an additional PDN connection for relaying is needed, ProSe UE-to-network relay 302 may initiate a new PDN connection establishment procedure for relaying (step 312b). An IPv6 prefix or IPv4 address may then be allocated for remote UE 301 (step 313), and uplink and downlink traffic relaying may then begin. ProSe UE-to-network relay 302 may send a remote UE report (comprising, e.g., information including but not limited to a remote user ID and/or IP info) message to MME 304 for the PDN connection associated with the ProSe UE-to-network relay 302 (step 314). The remote user ID may comprise an identity of the remote UE 301 user (provided via user info) that was successfully connected in step 312a. MME 304 may store the remote user IDs and the related IP info in the ProSe UE-to-network relay's 302 evolved packet system (EPS) bearer context for the PDN connection associated with the relay. MME 304 may forward the remote UE report message to S-GW 305, and S-GW 305 may forward the message to P-GW 306 of the UE-to-network relay 302 (step 315). For example, MME 304 may report multiple remote UEs in one remote UE report message. Relayed traffic may then be transmitted and received (step 316).

Figure 4:
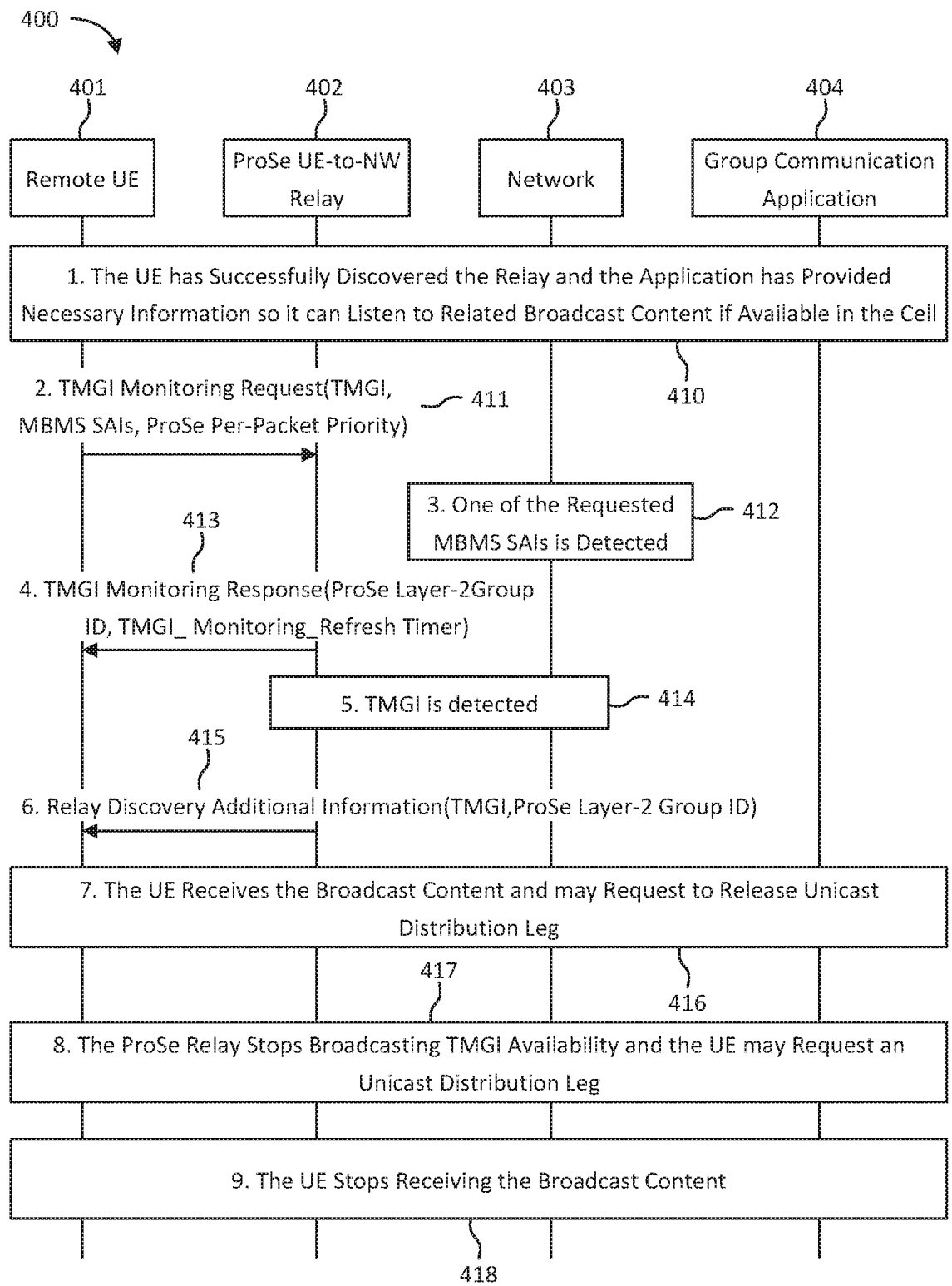
FIG. 4 is a diagram of an example procedure for requesting the monitoring of a Temporary Mobile Group Identity (TMGI)

FIG. 4 is a diagram of an example procedure 400 for requesting the monitoring of a Temporary Mobile Group Identity (TMGI). In the example of FIG. 4, a remUE may request a ProSe UE-to-network relay to start monitoring availability of a specific TMGI. In this example, to distinguish the remote UE from the relay UE, the remote UE is referred to as a remUE, while the relay may be referred to as a relayUE. When the TMGI is detected on the serving cell, the ProSe UE-to-network relay may broadcast the detected TMGI and its corresponding ProSe layer-2 group ID by using relay discovery additional information sent on the discovery transport. The eMBMS traffic related to this TMGI, if available, may be forwarded to the remote UEs served by the relay over a one-to-many link identified by a specific ProSe layer-2 group ID provided by the relay when the procedure is executed.

Referring to FIG. 4, the remote UE 401 (remUE) may discover the ProSe UE-to-network relay 402 (relayUE) and may have obtained (in band or out-of-band) the TMGI, QoS class identifier (QCI), radio frequencies, and Multimedia Broadcast Multicast Services (MBMS) Service Area Identifier (SAIs) to receive related eMBMS content (step 410). The application layer in the UE may sets the ProSe Per-Packet Priority associated with the TMGI. Remote UE 401 may send to the ProSe UE-to-network relay 402 a TMGI Monitoring Request (TMGI, MBMS SAIs, ProSe per-packet priority) even if it has already known the ProSe layer-2 Group ID for the corresponding TMGI (step 411). The ProSe UE-to-network relay 402 may retrieve a list of MBMS SAIs from the system information of the cell on which it is camped and may check whether at least one of the MBMS SAIs obtained at step 411 is included in the MBMS SAI list (step 412). If the ProSe UE-to-network relay 402 detects at least one of the request MBMS SAIs, the ProSe UE-to-network relay may acknowledge the request with a TMGI monitoring response (ProSe layer 2 Group ID, TMGI_Monitoring_Refresh Timer, SAI indicator=true) to remote UE 401 (step 413). The ProSe layer 2 Group ID may be used to forward to remote UEs the eMBMS content related to the TMGI value received at step 411. The relay stops monitoring the TMGI when TMGI_Monitoring_Refresh Timer expires, unless the TMGI Monitoring Request procedure is executed again. The ProSe UE-to-network relay 402 may detect the TMGI it has been requested to monitor (step 414). Upon detection of the TMGI, the ProSe UE-to-network relay 402 may broadcast availability of the TMGI and the corresponding ProSe layer 2 Group ID by sending a relay discovery additional information message (TMGI, ProSe layer 2 group ID) to remote UE 401 (step 415). This may be repeated with a configurable repetition interval, which may be smaller than the TMGI_Monitoring_Refresh Timer. The value of the TMGI may be used by devices discovering the UE-to-network relay 402 as a preference criterion for relay selection, if they are interested in the TMGI the relay is advertising. Remote UE 401 may detect the announcement of step 415 and subsequently may start to receive the broadcast content on the PC5 ProSe one-to-many link associated to the Prose layer-2 Group ID defined at step 413, and remote UE 401 may request to release a unicast distribution leg if any was being used (step 416). The ProSe UE-to-Network Relay may apply the received ProSe per-packet priority value in step 411 to transmit the eMBMS traffic over the PC5 interface. Remote UE 401 belonging to an announced TMGI may receive the relayed eMBMS traffic via ProSe layer-2 group ID even if remote UE 401 does not yet complete the TMGI monitoring request/response procedure.

Upon detection of a loss of TMGI, the ProSe UE-to-network relay 402 may stop broadcasting availability of the TMGI, and remote UE 401 may request a unicast distribution leg from the GCS AS (step 417). ProSe UE-to-network relay 402 may send a positive indication of loss of TMGI to accelerate loss of TMGI detection in the UE (not shown in FIG. 4). Remote UE 401 may stop receiving the broadcast content (step 418) on the PC5 ProSe one-to-many link associated to the Prose layer group-2 ID defined at step 413. The relative ordering between step 417 and 418 may be dependent on when the eMBMS content becomes unavailable in the cell.

3GPP identifiers used for ProSe functionality are described herein. The following identifiers for EPC-level ProSe Discovery may be used in the examples described herein: EPC ProSe User ID, Application Layer User ID, and Application ID. The ProSe function may be identified by a fully qualified domain name (FQDN) that the UE constructs using the home public land mobile network (HPLMN) ID.

The following identifiers for ProSe direct communication may be used in the embodiments described herein:

ProSe UE ID: This may comprise a link layer identifier that is used as a source layer-2 ID in all the packets the UE sends for one-to-many and one-to-one ProSe direct communication.

The ProSe Key Management Function may ensure that the ProSe UE ID is unique in the context of one-to-many ProSe direct communication for this group. When bearer-level security is configured not to be used, the ProSe UE ID may either be configured in the UE or self-assigned by the UE.

ProSe Layer-2 Group ID: this may comprise a link layer identifier that identifies the group in the context of one-to-many ProSe direct communication. It may be used as a destination layer-2 ID in all the packets the UE sends to this group for one-to-many ProSe direct communication.

The following identifiers for ProSe Direct discovery may be used in the embodiments described herein:

ProSe Application ID: for open ProSe discovery, the ProSe application ID is called the Public ProSe application ID. The geographic scope of the public ProSe application ID may be PLMN-specific, country specific or global.

Each public ProSe application ID may be composed of a ProSe application ID name and the PLMN ID that corresponds to the PLMN that assigned the ProSe application ID name.

ProSe application code may be obtained from the HPLMN ProSe function using the announce request procedure for the announcing UE and the monitor request procedure for the monitoring UE.

Each ProSe Application Code may comprise a temporary identity that corresponds to the ProSe Application ID Name and the PLMN ID of the ProSe Function that assigned the ProSe Application Code.

The following identifiers for ProSe UE-to-network relay discovery and selection-model A may be used in the embodiments described herein:

ProSe Relay UE ID may comprise a link layer identifier that is used for direct communication and is associated with a relay service code. A UE-to-network relay may have a distinct ProSe relay UE ID for each relay service code. For support of multiple PDN connections, the ProSe UE-to-network relay may be assigned a different ProSe relay UE ID for each PDN Connection.

Announcer info may comprise information about the announcing user.

Relay Service Code may comprise a parameter(s) identifying a connectivity service and configured in a ProSe UE-to-network relay for advertisement. The relay service code may also identify authorized users to which the ProSe UE-to-network relay may offer service, and may select the related security policies or information, e.g. for authentication and authorization between the remote UE and the ProSe UE-to-network relay The following identifiers for ProSe UE-to-network relay discovery and selection-model B may be used in the embodiments described herein:

Discoverer Info may comprise information about the discoverer user.

Relay service code may comprise information about connectivity in which the discoverer UE is interested. The relay service codes may be configured in the remote UEs interested in related connectivity services.

ProSe relay UE ID may comprise a link layer identifier of a UE-to-Network Relay that may be used for direct communication and is associated with a relay service code. A UE-to-network relay may have a distinct ProSe relay UE ID for each relay service code.

Discoveree Info may comprise information about the discoveree.

The following identifiers for group member discovery (model A) may be used in the embodiments described herein:

ProSe UE ID may comprise a link layer identifier that may be used for subsequent direct one-to-one and one-to-many communication.

Announcer Info may comprise information about the announcing user.

Discovery group ID may comprise an identifier of a discovery group to which the UE belongs.

The following parameters may be used in the group member discovery solicitation message (model B):

Discoverer Info may comprise information about the discoverer user.

Discovery Group ID may comprise an identifier of a discovery group to which the targeted UE belongs.

Target Info may comprise information about the targeted discoverees (single user or group). The Target Info may be provided by the upper layers of the UE.

The following parameters may be used in the group member discovery response message (model B):

ProSe UE ID may comprise a link layer identifier that may be used for subsequent direct one-to-one and one-to-many communication.

Discoveree Info may comprise information about the discoveree.

Discovery Group ID may comprise an identifier of the discovery group to which the discoveree UE belongs.

The following identifiers for relay discovery additional information may be used in the embodiments described herein:

Relay service code may comprise a code associated with the message and used to identify the security parameters used by the receiving UE to process the discovery messages.

ProSe relay UE ID may comprise a link layer identifier that is used for direct communication and is associated with a relay service code.

Announcer info may comprise information about the announcing user.

TMGI may indicates the MBMS the ProSe UE-to-network relay is relaying.

ProSe Layer-2 Group ID may comprise a link layer identifier of the group that transmits the MBMS traffic corresponding to the TMGI.

The E-UTRAN Cell Global Identifier (ECGI) may identify of the serving cell of the ProSe UE-to-network relay.

A single relay discovery additional information message may carry information including but not limited to the following:

the ECGI on which the ProSe UE-to-Network Relay is camped;

one or more advertised TMGIs and their corresponding ProSe layer-2 group IDs up to the maximum allowed message size; or the ECGI that the ProSe UE-to-network relay is camped on, and one or more advertised TMGIs and their corresponding ProSe layer-2 group IDs up to the maximum allowed message size.

The following requirements have been specified for the 5G system but have not yet been addressed in the system:

(1) the 5G network shall optimize the resource use of the control plane and/or user plane to support high density connections (e.g., 1 million connections per square kilometer) taking into account, for example, the following criteria: type of mobility support; communication pattern (e.g., send-only, frequent or infrequent); characteristics of payload (e.g., small or large size data payload); characteristics of application (e.g., provisioning operation, normal data transfer); UE location; timing pattern of data transfer (e.g., real time or non-delay sensitive).

(2) Based on operator's policy, the 5G system shall be able to prevent UEs from accessing the network using relevant barring parameters that vary depending on Access Identity and Access Category. Access Categories are defined by the combination of conditions related to the UE and the type of access attempt. One or more Access Identities and only one Access Category are selected and tested for an access attempt.

(3) The 5G network shall be able to broadcast barring control information (i.e. a list of barring parameters associated with an Access Identity and an Access Category) in one or more areas of the RAN.

(4) The UE shall be able to determine whether or not a particular new access attempt is allowed based on barring parameters that the UE receives from the broadcast barring control information and the configuration in the UE.

(5) In the case of multiple core networks sharing the same RAN, the RAN shall be able to apply access control for the different core networks individually.

(6) The unified access control framework shall be applicable both to UEs accessing the 5G CN using E-UTRA and to UEs accessing the 5G CN using NR.

(7) The unified access control framework shall be applicable to UEs in RRC Idle, RRC Inactive, and RRC Connected at the time of initiating a new access attempt (e.g. new session request). A "new session request" in RRC Connected may refer to events, e.g., a new 3GPP/NGN IP Multimedia Subsystem (IMS) multimedia telephony service (MMTel) voice or video session, sending of short message service (SMS) (SMS over IP, or SMS over NAS), new PDU session establishment, existing PDU session modification, and service request to re-establish the user plane for an existing PDU session.

(8) The 5G system shall support means by which the operator can define operator-defined Access Categories to be mutually exclusive. Examples of criterion of operator-defined Access Categories may comprise network slicing, application, and application server.

(9) The unified access control framework shall be applicable to inbound roamers to a PLMN. The serving PLMN may be able to provide the definition of operator-defined Access Categories to the UE.

Many IoT Applications may be characterized as being delay tolerant, i.e. they may exchange data with servers or devices and whether the data is delivered to the destination in a timely manner is not relevant to the overall application layer functionality. Many such applications are hosted on UEs that experience disruptions in their connectivity or on UEs that only communicate at scheduled times (e.g., sensors that collect environmental data for over a 24-hour period, compress 24-hour's worth of data, and then attempt to send the data to a remote server). The services and capabilities that are offered by the 3GPP network (EPC and 5GC) largely rely on the ASs and UE applications to coordinate their delay tolerant communication activities. The 3GPP network does not offer much, in terms of services, to the UE and ASs to support delay tolerant communication.

In another example, devices in a smart grid may share data with one another and with a service capability server (SCS) infrastructure where it is analyzed. The output of the data analysis may need to be transferred to the end users and smart appliances, e.g., the output may be an updated set of instructions that describe when a smart appliance should run. For applications with limited connectivity, intermediary nodes may need to store/carry data until they find an opportunity to forward the data to its end destination.

Figure 5:
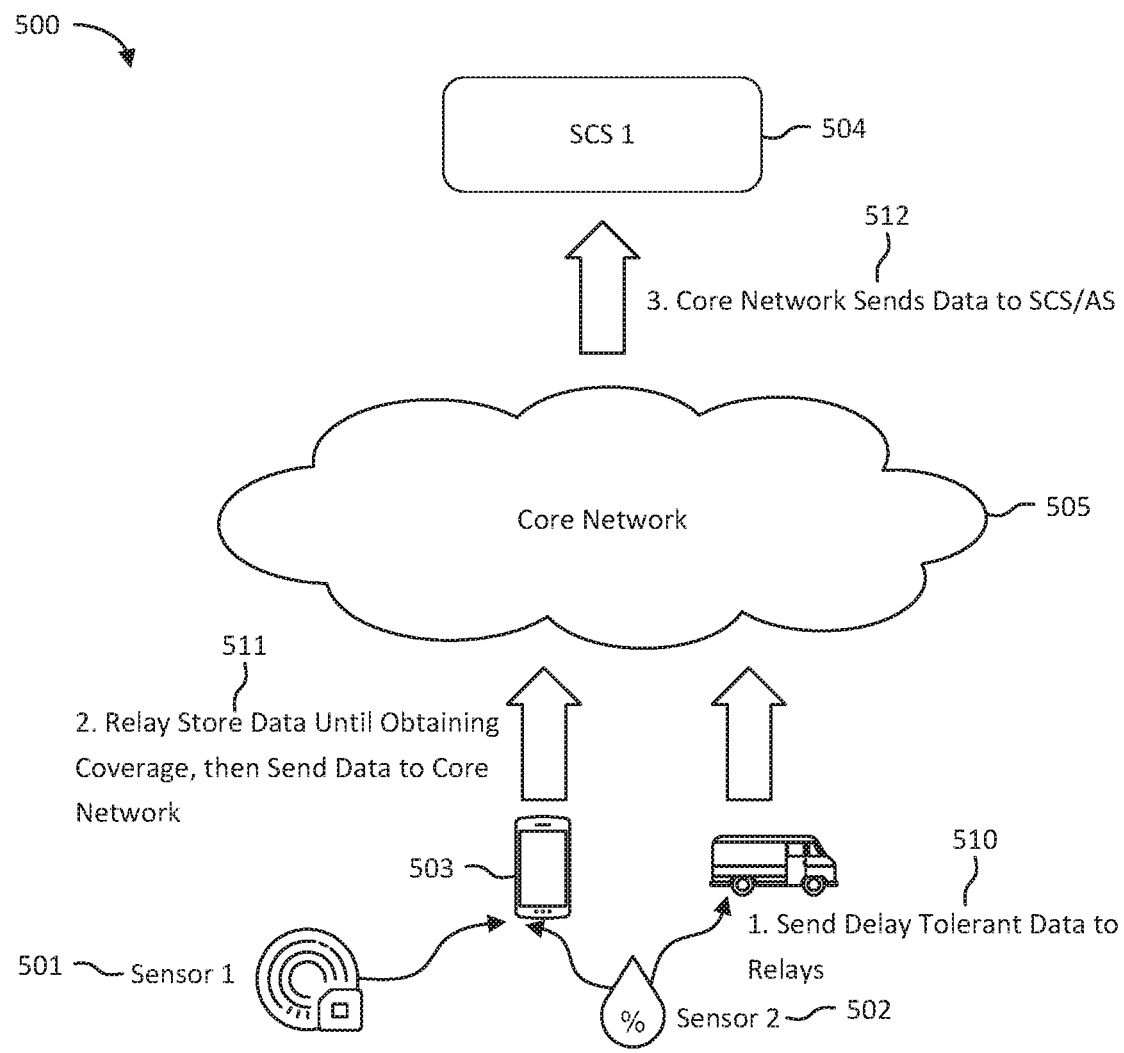
FIG. 5 is an example system for a delay tolerant data UL use case.

FIG. 5 is an example system 500 for a delay tolerant data UL use case. One communication model for delay insensitive applications may be found in rural environments, where network coverage is often inadequate. Non-real-time internet access (e.g., for emails) may be attained by implementing a network of kiosks 503 collecting data from mobile devices over point-to-point links. The data is then collected and transferred by relays 510 placed on buses to areas with coverage, where the data exchange with the core network (CN) 505 takes place. The same model may be used by a remote server (e.g., SCS 504) to collect data from a number of sensors 501, 502 distributed in an urban environment and charging the delay tolerant data differently, where each sensor does not have its own subscription and instead has some other 3GPP identity (i.e. a user identity). Relays store data until obtaining coverage and then send the data to CN 511.

In systems where low cost IoT devices communicate with one or more M2M servers using relays to carry delay tolerant data in an opportunistic manner, data senders may not immediately know when and if their data has reached the destination and may not always know the best relay to forward their data to. This may result in duplicate copies of the data being sent toward the destination. Data paths available for delivery of responses may be different from the original data path. Thus the following issues/inefficiencies may appear:

The same data bundle may be transmitted to multiple relays, resulting in multiple copies that only the endpoints can resolve. Until arriving at the endpoint, these copies use network resources unnecessarily. If only a single copy is sent from the end sensor, delivery to the endpoint is less likely to be successful. There may be no information available within the network (other than at the SCS) that allows other nodes to eliminate duplicates, and therefore network resources are wasted.

Many 5G error correction techniques rely upon retransmissions, without taking in consideration possible data duplicates available in the system. Therefore, in cases in which duplicates are available the error correction mechanisms are not optimized. Further, an end-to-end path between the data source and destination may not exist, thus data and responses may need to be allowed to arrive using different paths. The alternative would be to send the responses to every possible relay, which may tend to flood the system. Current techniques for UE to relay communication occur on "general purpose" connections. This does not allow more sophisticated models to deal with the heterogeneity of the data, e.g. sensors, emails, etc. which may also have different destinations. Accordingly, there is a need for a mechanism to maintain relative priorities between data bundles from different UEs.

The ProSe relay model relies on the sensors being UEs. However some IoT use cases such as the collection of data in the urban environment introduced above may require the use of sensors identifiable by the CN but with no cellular service subscription. There is a need for improved ways for using information available at relays or in the networks regarding expected paths or connectivity periods used in order to optimize DL data delivery when it is delay tolerant, for example, by buffering it at the relay, without the involvement of the originator in delaying or re-transmitting. There is a need for methods for using delay tolerant communications to provide for delayed paging or triggering or for tracking a sensor based on its relay or peer-to-peer communications. There is also a need for methods for offloading group and multicast capabilities to relays, which would be very useful for massive IoT.

Described herein are delay tolerant data service (DTDS) methods for using 5GC capabilities providing optimized connectivity in scenarios that allow for delay tolerant data (DTD) and functionality. Described herein are methods to enable DTDSs in a system via DTDtags that accompany DTD bundles. Described herein is a DTDS and DTDS implementations in the 5GC (e.g., DTDS@CN) as a NF and in UEs and relays (e.g., DTDS@UE). The service provides functionality including but not limited to the following:

Duplicate detection and resolution of UL data sent through connections to multiple relays;

Aggregation/disaggregation of DTD from one or multiple endpoints thereby saving network resources;

Advanced filtering and/or pre-processing of the endpoint data before using network resources to communicate it further, including appending necessary metadata;

Reliability assistance by providing or processing partial acknowledgements of data receipt as the delay tolerant data travels along the communication path, assisting in data path optimizations, providing error correction, enabling evaluation of communication performance, adding redundancy to increase the chance of delivery, etc.;

Prioritization and QoS assistance in determining the UL bearer on which received bundles should be transmitted, using DTDtag-based policies; and Specialized charging assistance using rules and policies based on DTDtags.

Methods for how DTDS functions in the CN and functions at relays may be configured and initialized are described herein. In addition to the relay case, the case of UEs connecting directly to the CN and configuring DTDS is described herein. Methods for DTD delivery are described herein. The procedures described comprise use cases of connectivity loss and re-establishment that highlight some of the features of the DTDS. Additional delay tolerant services at the DTDS, namely a delay tolerant paging procedure and group and eMBMS tolerant procedures are also described herein.

FIGS. 6 to 11 (described hereinafter) illustrate various embodiments associated with DTDS. In these figures, various steps or operations are shown being performed by one or more nodes, apparatuses, devices, servers, functions, or networks. For example, the apparatuses may operate singly or in combination with each other to effect the methods described herein. As used herein, the terms apparatus, network apparatus, node, server, device, entity, network function, and network node may be used interchangeably. It is understood that the nodes, devices, servers, functions, or networks illustrated in these figures may represent logical entities in a communication network and may be implemented in the form of software (e.g., computer-executable instructions) stored in a memory of, and executing on a processor of, a node of such network, which may comprise one of the general architectures illustrated in FIG. 12A or 12B described below. That is, the methods illustrated in FIGS. 6 to 11 may be implemented in the form of software (e.g., computer-executable instructions) stored in a memory of a network node, such as for example the node or computer system illustrated in FIG. 12C or 12D, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 12C and 12D, respectively) of the node under control of the processor of the node and the computer-executable instructions (e.g., software) that it executes. It is further understood that the nodes, devices, and functions described herein may be implemented as virtualized network functions.

Figure 6:
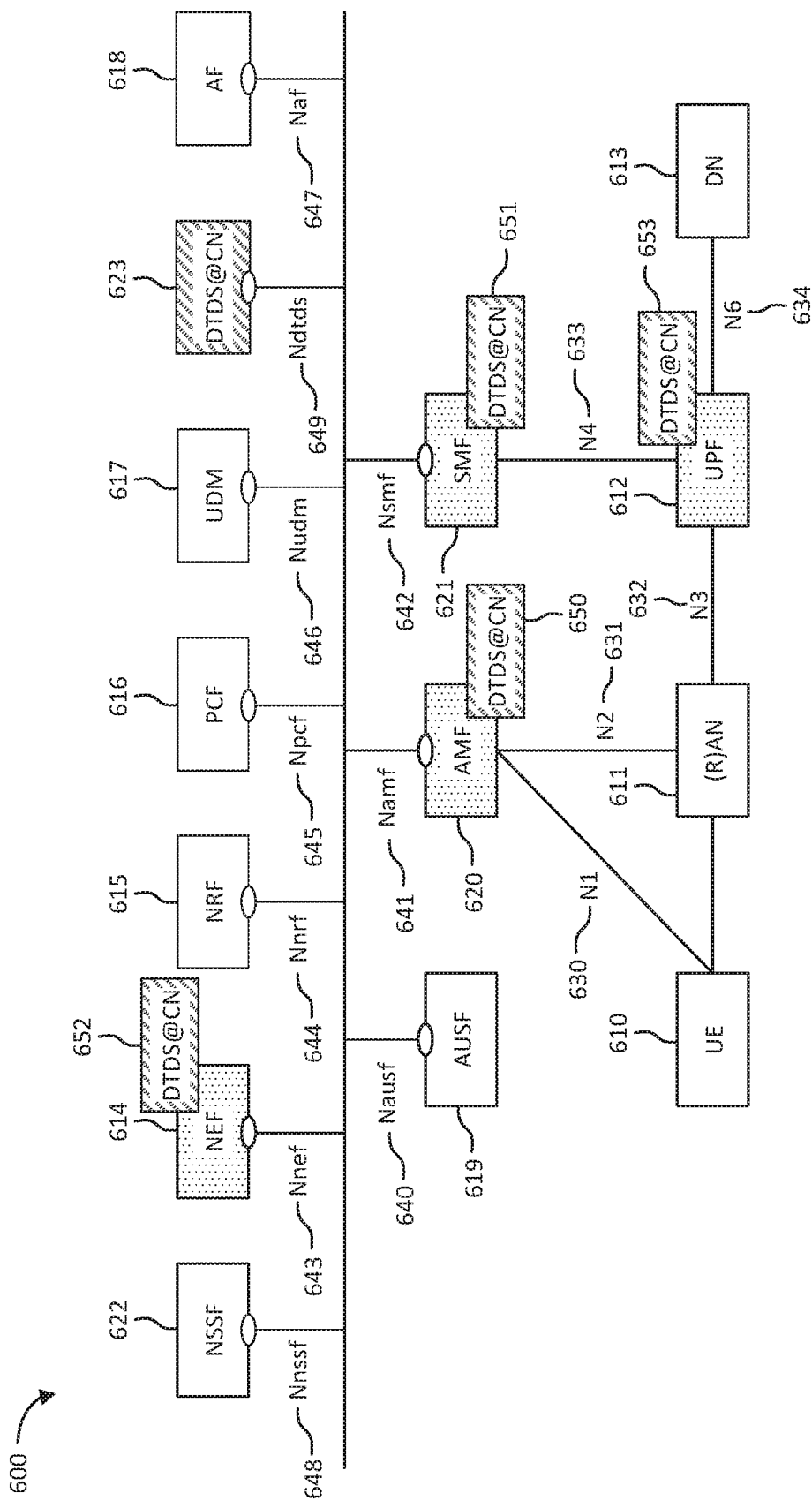
FIG. 6 is a diagram of an example 5G architecture depicting DTDS@CN functionality as both a stand-alone or integrated NF, which may be used in combination with any of the embodiments described herein.

FIG. 6 is a diagram of an example 5G architecture 600 depicting DTDS@CN functionality as either a stand-alone or an integrated NF, which may be used in combination with any of the embodiments described herein. As shown in the example of FIG. 6, UE 610 has access, via RAN 611, to AMF 620 over N1 interface 630. Namf interface 641 is also shown. RAN 611 has access to AMF 620 via N2 interface 631. RAN 611 has access to UPF 612 via N3 interface 632. UPF 612 has access to SMF 621 via N4 interface 633. Nsmf interface 642 is also shown. UPF 612 has access to DN 613 via N6 interface 634. Other NFs within the control plane are shown in the example of FIG. 6, such as NEF 614 and Nnef interface 643, NRF 615 and Nnrf interface 644, PCF 616 and Npcf interface 645, UDM 617 and Nudm interface 646, AF 618 and Naf interface 647, and AUSF 619 and Nausf interface 640, and NSSF 622 and Nnssf interface 648.

FIG. 6 also depicts the enablers for providing DTD support and optimizations in 5G. 5G functionality for DTD may be implemented in the CN or in nodes such as relays. DTDS functionality in the CN may be implemented in a separate NF, e.g., the DTDS@CN NF 623 and Ndtds interface 649. This functionality may also be included in an existing NF, e.g., in the AMF 620 as DTDS@CN 650, SMF 621 as DTDS@CN 651, NEF 614 as DTDS@CN 652, or in a UPF 612 as DTDS@CN 653, as shown in FIG. 6. The stand-alone DTDS@CN NF 623 may interact with these or any other NFs in the CN. It may be a common NF for several network slices, or it may be dedicated to a network slice. The DTDS@CN may have aspects implemented separately as part of the Control and Data Planes.

In the embodiments described herein, DTDS functionality may be implemented, for example, in relays using the ProSe UE-to-network terminology and paradigm as described above. As used herein, the term relay UE (relayUE) may refer to a UE attaching to the network and supporting connectivity to the network for other remote UEs (remUEs). UEs may also act as relays for non-3GPP devices, i.e. capillary devices. Moreover, UEs may use the DTDS for its own mobile originated (MO)/mobile terminated (MT) data. As such, the DTDS implemented by any UE (acting as relay or not) is described herein as DTDS@UE. The DTDS may offer a number of delay tolerant services, including but not limited to the following:

Duplicate detection: The DTDS may determine when an endpoint has sent multiple copies of the same data (for instance due to a connection to multiple relays), and it may delete the copies.

Aggregation: The ingress DTDS (i.e. DTDS@CN for DL and DTDS@UE for UL) may aggregate data from one or multiple endpoints, and may treat the aggregated data as a single 3GPP packet, thereby saving network resources. The egress DTDS (i.e. DTDS@UE for DL and DTDS@CN for UL) may de-aggregate the 3GPP packet into the individual data. The aggregation may be per endpoint type, per priority of traffic generated by the endpoint, etc.

Advanced filtering and/or processing: The DTDS may perform processing or filtering of the endpoint data. For example, a relay connected to multiple water level sensors may be configured with a normal mode when it sends a first sensor reading received in the hour. The same relay may have a flood warning mode when all the sensor readings are relayed. Similarly, statistical analysis such as averaging, finding variance, etc. may be provided closer to the network edge and lowering over-the-air communications and centralized processing needs. DTDS@UE functionality may also provide additional or derived information/metadata about the collected data, for example, DTDS@UE may add collection location information, although the individual sensors are mobile and un-equipped with location services on their own.

Reliability assistance: the DTDS may provide or process partial acknowledgements of data receipt as the delay tolerant data travels along the communication path. This assists in path optimizations in both UL and DL and in providing reliability in cases with especially unreliable data delivery.

The DTDS may also assist in providing error correction, which enables the system to lower the over-the-air detection and correction scheme requirements. For example, in the case where the delay tolerant endpoint data is available in multiple copies, errors may be resolved without additional over-the-air transmissions to correct each copy. In this role, DTDS may also assist with evaluation of communication performance, e.g. end-to-end delays, throughput.

The DTDS may also provide reliability through redundancy. For example, the DTDS@CN may send DL data to multiple relays that may be able to transmit the data to the destination endpoint, increasing the chance of delivery.

Prioritization and QoS assistance: DTDS in relays may provide assistance in determining on which UL bearer received bundles should be transmitted and when. For example, the relay may be provided with simple rules or policies that may be used in addition to priorities indicated over the remote UE-to-relay link, in order to determine the timing and QoS of the UL re-transmissions.

Specialized charging assistance: DTDS may be used to implement novel charging schemes. For example, DTDS@UE may be configured to tag UL data from multiple remUEs such that the entire data stream is charged using a specific subscription, which may be DTD specific and common for the remUEs, etc. Similarly, data delivery to/from non-3GPP capillary devices may be tagged to be charged using a specific subscription, although the devices do not have subscriptions in the 3GPP system. DTDS@UE may also indicate for charging purposes how much UL data has been collected but eliminated through local processing or aggregation at a relay. Conversely, DTDS@CN may keep track of the DL data sent multiple times over the air for the purpose of reliable delivery to enable appropriate charging.

Figure 7:
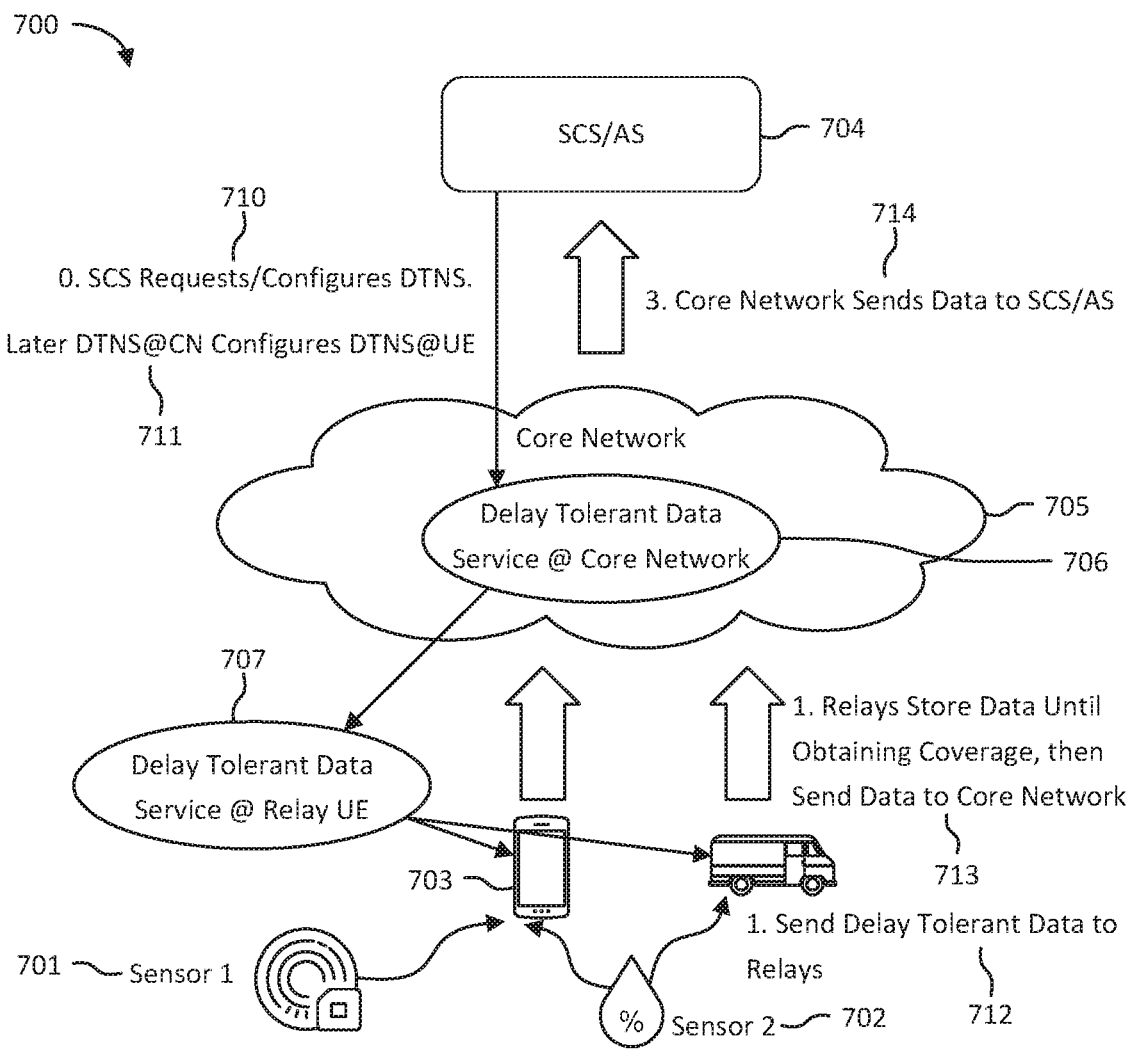
FIG. 7 is a diagram of an example DTDS deployment.

FIG. 7 is a diagram of an example DTDS deployment 700, which may be used in combination with any of the embodiments described herein. The example DTDS deployment 700 of FIG. 7 depicts an UL use case and depicts the DTDS@CN 706 and the DTDS@UE 707. As shown in the example of FIG. 7, SC S/AS 704 may request and configure the DTDS (step 710). DTDS@CN 706 may configure the DTDS@UE 707 (step 711). A network of kiosks 703 may collect data from mobile devices over point-to-point links. The delay tolerant data may be collected and sent to relays (step 712). The relays may store the data until obtaining coverage, and then send the delay tolerant data to the CN 705 (step 713). The CN 705 may then send the delay tolerant data to the SCS/AS 704 (step 714).

In the embodiments described herein, Delay Tolerant Data in the 5GC can be organized in bundles that are identified with DTDtags. DTDtags may comprise identifiers for delay tolerant data in the network. The DTDtags may be used at the data endpoints (e.g. sensors, UEs, and SCS/AS) to identify delay tolerant bundles of data. A Service Provider may be responsible for providing configuration information to the SCS/AS, for example via pre-provisioning that determines the format of the DTDtags, rules for DTDtag use, etc.

The DTDtags may comprise information including but not limited to the following:

Information identifying a service or application or a service/application type (e.g. Serv_type);

Information identifying a service/application instance or flow (e.g. Flow_id) or a pre-agreed prioritization or QoS category (e.g. Cat_index); and Information identifying the data bundle within the service/application instance or flow (e.g. Bundle_id).

Other numbering information may be implemented, for example, including identifiers for the originator and source instead of a flow, etc. The numbering schemes may be MNO or SP specific, they may be standardized or global and may include existing identifiers (e.g. IP address and port ids of endpoints instead of Flow_id).

In the embodiments described herein, UEs may be pre-provisioned to be able to create/manage DTDtags or may be configured out of band by a SC S/AS.

DTDtags may be used in addition to or instead of traffic flow and packet identifiers associated with other types of traffic and may be used for purposes including but not limited to the following:

To create a flow or stream of delay tolerant data which may be communicated over various paths. For this purpose, the DTDtags may be independent of IP packet numbering, although the source and destinations may be identified similarly. When receiving packets pertaining to a given DTDtag, a relay may wait until the entire bundle is received before relaying it, if the delay tolerant parameters are met. Note that the DTDtags can then be effectively used for identification of DTD data flows. They also allow for the use of a connectionless control plane (signaling) mode for delay-tolerant data exchanges on the user plane.

To identify Core Network entities serving the data flow.

To prioritize, aggregate or buffer DTD traffic. For example, a relay may aggregate all bundles with a given Serv_type and may prioritize them to be sent before all other bundles when network coverage allows it. Alternatively, the relay may be provided with a mapping table to determine for how long a bundle with a given Flow_id or Cat_index is to be buffered or on which UL bearer it is to be transmitted. A relay may also re-order bundles received out of order (based on Bundle_id) before re-transmitting them.

To enable reliability and resource optimizations by using the entire DTDtag. For example, duplicate detection may be performed by matching tags against the list of UL DTDtags already received by the system and enables resource optimization. Conversely, when duplicate DTDtags are found they may be used for error correction, similarly to retransmissions. Reliability via redundancy may be enabled in the DL by sending the same data with the same DTDtag to multiple relays. Reliability may also be enabled by including the DTDtags in partial acknowledgements for the bundles received.

To provide advanced filtering and processing by identifying the data that needs to be included in this process. For example, a simple relay service gathering data from many temperature and water level sensors may provide averaging of the data accumulated every 10 minutes before sending it on the UL. It may use Serv_type to distinguish between the two types of data.

To implement DTDtag-based charging schemes: DTDtags may be used to define charging policies used specifically for delay tolerant data services. By using DTDtag-based policies, an MNO may be able to distinguish traffic through the core network that is generated by or sent to non-3GPP devices through relays. This scheme may also enable charging schemes independent of the creation of traffic flows and sessions. For example, DL DTD sent to a medical device and to an advertisement device that is routinely transported by the same relay may be charged differently. In the case of the medical device, assuming delivery reliability is more important, each bundle may be sent via 20 relays, which for the advertisement device each bundle may be sent via 2 relays. In this example, requiring additional resources may result in being charged differently.

Figure 8:
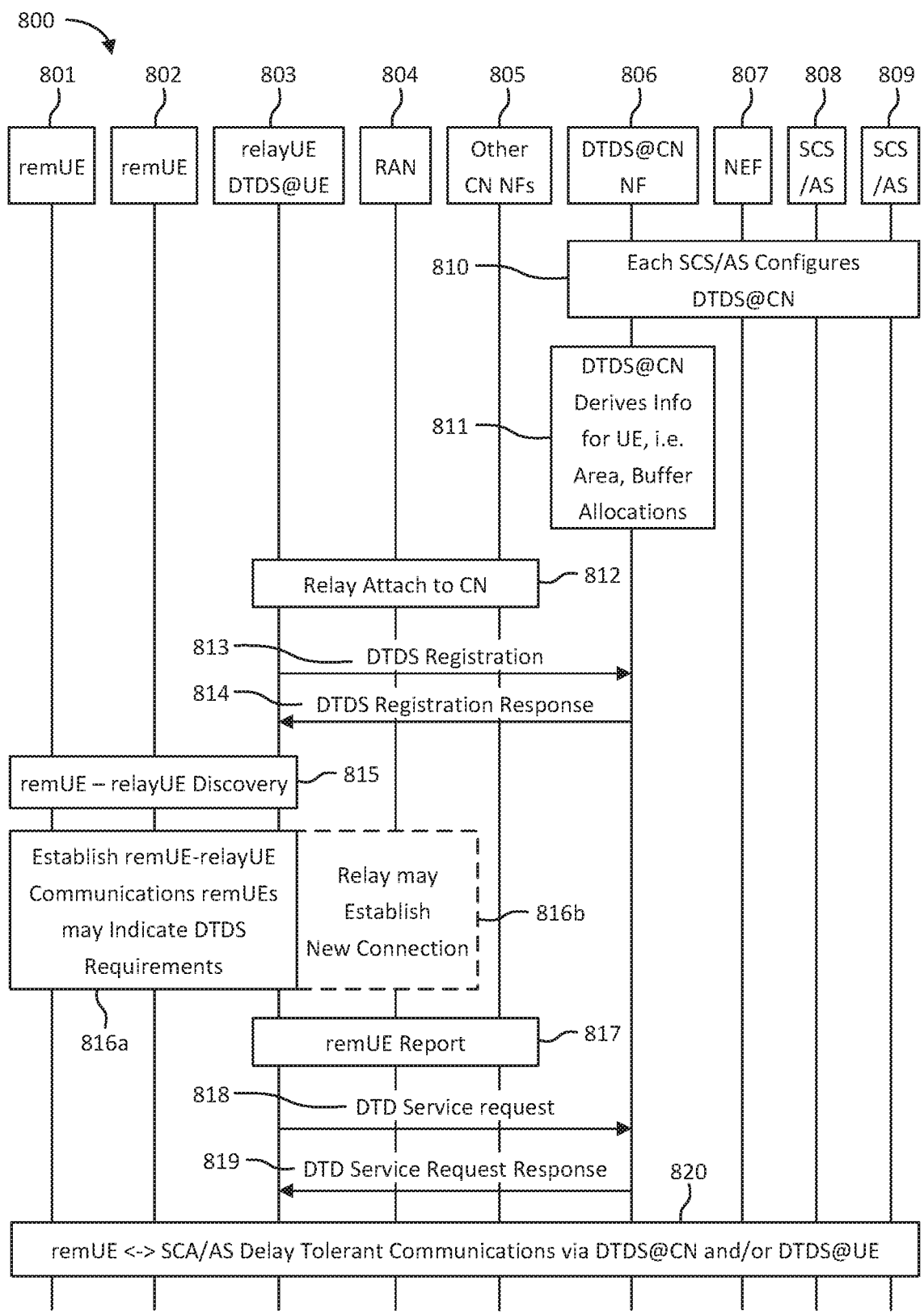
FIG. 8 is a diagram of an example procedure for DTDS configuration and establishment at the CN and relayUEs.

FIG. 8 is a diagram of an example procedure 800 for DTDS configuration and establishment at the CN and relayUEs, which may be used in combination with any of the embodiments described herein. In the example of FIG. 8, relayUEs are used for remUE data. The procedure 800 starts with the pre-configuration of the NF providing services for DTD in the CN (e.g. the DTDS@ CN NF 806) by SCS/ASs 808 and 809. The procedure includes steps to configure DTDSs at the relay UEs (e.g., DTDS@UE 803). The configuration of DTDS@UE 803 is performed when the relay attaches to the network and/or when remUEs that require DTDSs establish communications with the relays. After these procedural steps DTD exchanges may be performed. In another embodiment, the configuration of DTDS@UE may be performed by the SCS/AS, e.g., the NEF functionality may allow the SCS/AS to directly configure services at the relay, including DTDS@UE.

Referring to FIG. 8, each SCS/AS (e.g., SCS/AS 808 and SCS/AS 809) may provide the DTDS@CN NF 806 with configuration information for the services needed (step 810). Alternatively, provisioning of the DTDS@CN service with configuration information for DTD services may be performed in this initial step by UEs, e.g., after the attach procedure in which case the services supported by the UE provide information about their DTD needs, and the UE sends this information to the CN. Also, several of these parameters may be provided as part of a set of parameters describing expected UE behavior. The configuration information may also be provided via NEF 807 and may include parameters, including but limited to parameters in the following table:

TABLE 1

| DTDS configuration information from SCS/AS | |
| --- | --- |
| Field | Description |
| DTDS Endpoint ID List | IDs of the devices (e.g. UEs, capillary devices) with which the SCS/AS is planning to communicate with using delay tolerant services. The list may indicate separately the IDs of UEs (e.g. remUEs) and of relayUEs whose services the SCS/AS prefers or is constrained to use. For ProSe, these IDs may map for example to existing IDs, as detailed above. For capillary devices using non-3GPP communications to the relays, the DTDS Endpoint ID may be pre-provisioned or configured by SCS/AS out of band. Alternatively, a list of DTDtags may be provided, for which the configuration information applies. |
| Endpoint Type | The type of endpoint for which the SCS/AS is requesting a DTDS service. For example the service may be applied to all, to road-side sensors (of a certain type), to Internet capable devices without cellular connectivity (for instance for developing areas), etc. |
| DT data information type | Type of information to be communicated, including but limited to: data size ranges, data type, service type (e.g. measurement, picture, etc.) |
| Delay tolerance parameters | Delay tolerance information, such as: maximum delivery delay through CN, max number of UL bundle duplicates the SCS/AS can resolve itself or max number of UL bundle duplicates it requires the network to resolve, max delivery delay calculated from data generation time |

TABLE 1-continued

| DTDS configuration information from SCS/AS | |
|---|---|
| Field | Description |
| DTD services requested in CN | Type of services requested from the 3GPP DTDS NF, e.g. duplicate removal, aggregation and aggregation type, error correction. |
| Data path constraints | Information about constraints on the data path when used for DT services. For example, the data may be allowed to come only directly from the remUE, only via relayUEs, via specific relayUEs, etc. |
| Communication scheduling | Scheduling information for the data communication, such as: measurement reporting intervals (at the sensor), node sleep schedule. This information may be used for example in determining the timing of the DL transmissions and the relays used. |
| Service geographical information | Geographical information about the UEs for which the service should be offered. SCS may provide a specific area where remUEs require DTDSs |
| UL communications optimization settings | Configuration to optimize UL communications, e.g., transmit power saving parameters for the UL, data buffering parameters (e.g., indicator, timer, max buffer size). |

DTDS@CN NF 806 may derive information needed for providing its services (step 811). For example, DTDS@CN NF 806 may derive buffer sizes for each data type, may determine geographical areas that may correspond to the remUEs (e.g., remUE 801 and remUE 802) and relayUEs (e.g. relayUE 803) corresponding to a service, etc.

relayUE 803 may attach to the CN and other CN NFs 805 via RAN 804 (if not already attached) (step 812). At this time, the relayUE 803 may receive authorization policies for acting as a relayUE, parameters that enables it to perform discovery, etc. If relayUE 803 is already attached, it may be triggered by CN indicating that DTDSs have been configured in the network and the relay may register its own DTDS. Alternatively, the DTDS@CN NF 806 may provide DTDS information directly in a trigger message, effectively going directly to step 814.

Step 812 may comprise relayUE DTDS@UE 803 performing a 5G registration, service request, or PDU session establishment. The request may include an indication that the relayUE DTDS@UE 803 is attaching for the DTDS. The request may further include an identity that represents the instance of the DTDS service on the relayUE DTDS@UE 803 or in the network. The response from the network may indicate that the action is not allowed, or barred, at the present time due to network congestion or the network handling higher priority services. The response may also indicate a back off time to the relayUE DTDS@UE 803 so that it knows when it is able reply again. The relayUE DTDS@UE 803 may provide the back off time information to the remUEs (e.g., remUE 801 and remUE 802) so that the remUEs are aware of how long their data may be delayed, or buffered, in the relayUE DTDS@UE 803 or the back off time may be an indication to the remUEs of when the remUEs should try again. The relayUE DTDS@UE 803 may monitor system information that is broadcasted by the base station to determine whether accesses directed towards the DTDS are barred or not. Receiving a barred indication may indicate to the relayUE DTDS@UE 803 that this step should not be attempted.

In some embodiments. relayUE DTDS@UE 803 may indicate its DTDS (DTDS@UE) capabilities by sending a DTDS registration message that is routed to the DTDS@CN NF 806 (step 813). This 5G registration or service request may comprise the parameters listed in Table 2. In some embodiments, the information may be encoded as part of an S-NSSAI. In another example embodiment, this information may be included in the messages exchanged in step 812, during the relayUE DTDS@UE 803 attachment to the CN.

TABLE 2

| DTDS registration message | |
|---|---|
| Field | Description |
| DTDS ID | Service ID of DTDS@UE service at the relayUE to be registered with the DTDS@CN service |
| SCS/AS ID List | Identities of the SCS/ASs with which the remUE communicates in a delay-tolerant manner. Alternatively, this information may be provided in step 818 |
| DTDS@relay capabilities | DTDS-related capabilities of the relayUE, e.g. DTDS buffer sizes, etc. |

If a DTDS Registration message was sent by relayUE DTDS@UE 803, the DTDS@CN NF 806 may send a DTDS registration response message to the relayUE DTDS@UE 803 (step 814). If the DTDS registration message was part of a 5G registration or service request message, the response from the DTDS@CN NF 806 may be delivered to the relayUE DTDS@UE 803 as part of a 5G registration or service request response message.

Alternatively, the DTDS registration/response messages of steps 8133 and 814 may be performed in latter steps, e.g. step 818.

The relayUE DTDS@UE 803 may receive authorization policies for relaying delay tolerant traffic such as:

TABLE 3

| Field | Description |
| --- | --- |
| | DTDS registration response message |
| DTDS ID | Service ID of the DTDS@CN service |
| Conditional DTDS parameters | Conditions under which the relayUE is authorized to provide DTDSs when relaying traffic for remUEs, e.g. specific PLMNs, specific geographical areas, specific list of DTDS Endpoint ID for remUEs to be provided service with, etc. |
| DTDS@CN capabilities | Capabilities offered by DTDS@CN, e.g. error correction, duplication removal, etc. |

Discovery between remUE 801 and remUE 802 and relayUE DTDS@UE 803 may then be performed (step 815). If discovery is performed using is a ProSe link, the discovery may comprise Model A discovery or Model B discovery. The remUE 801, remUE 802, and relayUE DTDS@UE 803 may exchange their DTDS endpoint IDs.

The remUE (e.g., remUE 801 and remUE 802) to remUE 801 and remUE 802 and relayUE DTDS@UE 803 communications may then be established (step 816a). The remUE (e.g., remUE 801 and/or remUE 802) may indicate to the relayUE DTDS@UE 803 that it wants to connect for services including DTDS. In 5G, relayUE DTDS@UE 803 may indicate in turn to the network that it wants to connect to a slice that provides DTDS, e.g., via a specific indicator or NSSAI in the registration request. This step may be performed before relayUE DTDS@UE 803 registration in step 813 as well.

In some cases, the remUEs may be capillary devices that are not aware of DTDSs. For example, a capillary device may comprise a small sensor that communicates with relayUE DTDS@UE 803 via Bluetooth. In such cases, relayUE DTDS@UE 803 may request the DTDS service on behalf of the capillary device. SCS/AS (e.g., SCS/AS 808 and SCS/AS 809) may provide the CN with a list of capillary device IDs and the DTDS service(s) they are requested. The CN may then inform the relayUEs (e.g., relayUE DTDS@UE 803) about this list. When a capillary device on the list connects to a relayUE (e.g., relayUE DTDS@UE 803), it may enable the DTDS service requested by the SCS/AS (e.g., SCS/AS 808 and SCS/AS 809).

The IP address of the remUEs (e.g., remUE 801 and remUE 802) may then be assigned for ProSe links. If needed, relayUE DTDS@UE 803 may establish new connections with the network via RAN 804 for its relay role (step 816b). remUEs (e.g., remUE 801 and remUE 802) may indicate to relayUEs (e.g., relayUE DTDS@UE 803) their DTDS requirements including but not limited to the following information presented in Table 4:

TABLE 4

| Field | Description |
| --- | --- |
| | remUE requirements for DTD services |
| DTDS Endpoint ID | DTDS Endpoint IDs of the remUE |
| SCS/AS ID List | Identities of the SCS/ASs with which the remUE communicates in a delay tolerant manner. |
| DT data information type | Type of information to be communicated, including but not limited to: data size ranges, data type, service type (e.g. measurement, picture, etc.) |
| DTDtags | DTDtags for the UL and DL flows that are to be treated as delay tolerant. DTDtags are described herein and are configured at the remUE by the SCS/AS via out-of-band signaling or are pre-provisioned. |
| Scheduling info | Scheduling information for upcoming UL DTDS transmissions. Other information pertaining to upcoming UL communications, if known, e.g. data type, bundle data size, etc. |
| Geographical info | Geographical information, e.g. current location, predicted location at upcoming UL transmission. |
| Discovery info | Information about other discovered remUEs or relayUEs in a recent timeframe. | remUEs (e.g., remUE 801 and remUE 802) may also provide some of the information listed in step 810 as being provided by SCS/AS (e.g., SCS/AS 808 and SCS/AS 809) (Table 1). This is especially useful when the remUEs (e.g., remUE 801 and remUE 802) has the ability to provide further detail pertaining to its communications, with finer granularity than what is known at SCS/AS (e.g., SCS/AS 808 and SCS/AS 809). For example, the remUEs (e.g., remUE 801 and remUE 802) may provide exact data sizes and max delivery delay values instead of ranges, a specific service type rather than a list, its own precise measurement reporting interval, etc.

Alternatively, constrained remUEs (e.g., remUE 801 and remUE 802) may provide only minimal information about its DTDS communications, and may rely on configurations provided by SCS/AS (e.g., SCS/AS 808 and SCS/AS 809) to the network. For example a remUE (e.g., remUE 801 and remUE 802) may provide an indicator that it uses delay tolerant communications.

relayUE DTDS@UE 803 may send a report to the network about the remUEs with which it is in communication (step 817). This report may contain the DTDS endpoint IDs and, if applicable, IP information of the remUEs (e.g., remUE 801 and remUE 802).

relayUE DTDS@UE 803 may send a DTD-service request message to the DTDS@CN NF 806 for the delay tolerant services it needs to provide to the remUEs (e.g., remUE 801 and remUE 802) (step 818). The message may contain all the information received from the remUEs and listed above in step 816a and step 816b and Table 4. The message may also be used to send some or all information about the DTDS-related capabilities of relayUE DTDS@UE 803, such as that listed in step 813 and Table 2. This message may also include information about the DTDtags received by DTDS@CN NF 806.

DTDS@CN NF 806 may send a DTD-service request response message to the relayUE DTDS@UE 803 (step 819). In alternative implementations, steps 813 and 814 may be combined with steps 818 and 819 using combined registration and service request messages.

remUE-to-SCS/AS delay tolerant communications via DTDS@CN NF 806 and/or relayUE DTDS@UE 803 (step 820). The end-to-end, remUE-to-SCS/AS delay tolerant communications are facilitated by the CN for both UL and DL by using 3 separate communication segments asynchronously:

remUE (e.g., remUE 801 and remUE 802) to/from relayUE DTDS@UE 803 segment;

relayUE DTDS@UE 803 to/from DTDS@CN NF 806 segment; and

SCS/AS 808 and/or SCS/AS 809 to/from DTDS@CN NF 806 segment.

Assuming the relayUE DTDS@UE 803 is usually in network coverage and the remUE (e.g., remUE 801 and remUE 802) is often not connected to any relayUEs, the following may apply:

In the UL direction, the remUE to DTDS@UE data delivery is often asynchronous with respect to the DTDS@UE to DTDS@CN data delivery, e.g. when remUEs are not connected to any relayUEs. The DTDS@CN to SCS/AS data delivery may or may not be asynchronous with respect to the DTDS@UE to DTDS @CN data delivery, depending on the level of service provided by DTDS@CN. For example, if the SCS/AS requests no UL bundle duplication services to be provided by the CN, each UL bundle arriving to DTDS@CN may be immediately forwarded to the SCS/AS.

In the DL direction, the SCS/AS to DTDS@CN data delivery may be synchronous with the DTDS@CN to DTDS@UE data delivery, assuming that the relayUE is in coverage. The DTDS@UE to remUE data delivery is often asynchronous with respect to the DTDS@CN to DTDS@UE data delivery, e.g. when remUEs are not connected to any relayUEs.

Delay tolerant services may also be provided by the network for UEs that are directly connected to the network (i.e. without relays). It may be useful for UEs that go in and out of network coverage and whose applications may tolerate delays.

The same devices that may connect as remUEs to a relay in the example procedure 800 of FIG. 8 may connect directly to the CN if they are in coverage. In this case if end-to-end delivery of DL data or delay tolerant paging has not been achieved through the relays, the DTDS@CN may perform the data delivery/paging directly, and then inform relays to drop the bundle or paging not yet delivered. The relay-based DL data delivery procedure and the relay-based delay tolerant paging procedure both may be easily used/adjusted for this case. The UL DTD data delivery procedure may also be used/adjusted for this case with the DTDS@CN resolving duplicates or the DTDS@UE waiting for possible late confirmations of the end-to-end delivery, even if the UE is in network coverage.

The same devices that act as relayUEs in the example procedure 800 of FIG. 8 may also act as stand-alone UEs and request DTDSs for they own data, e.g. the delay paging procedure.

Figure 9:
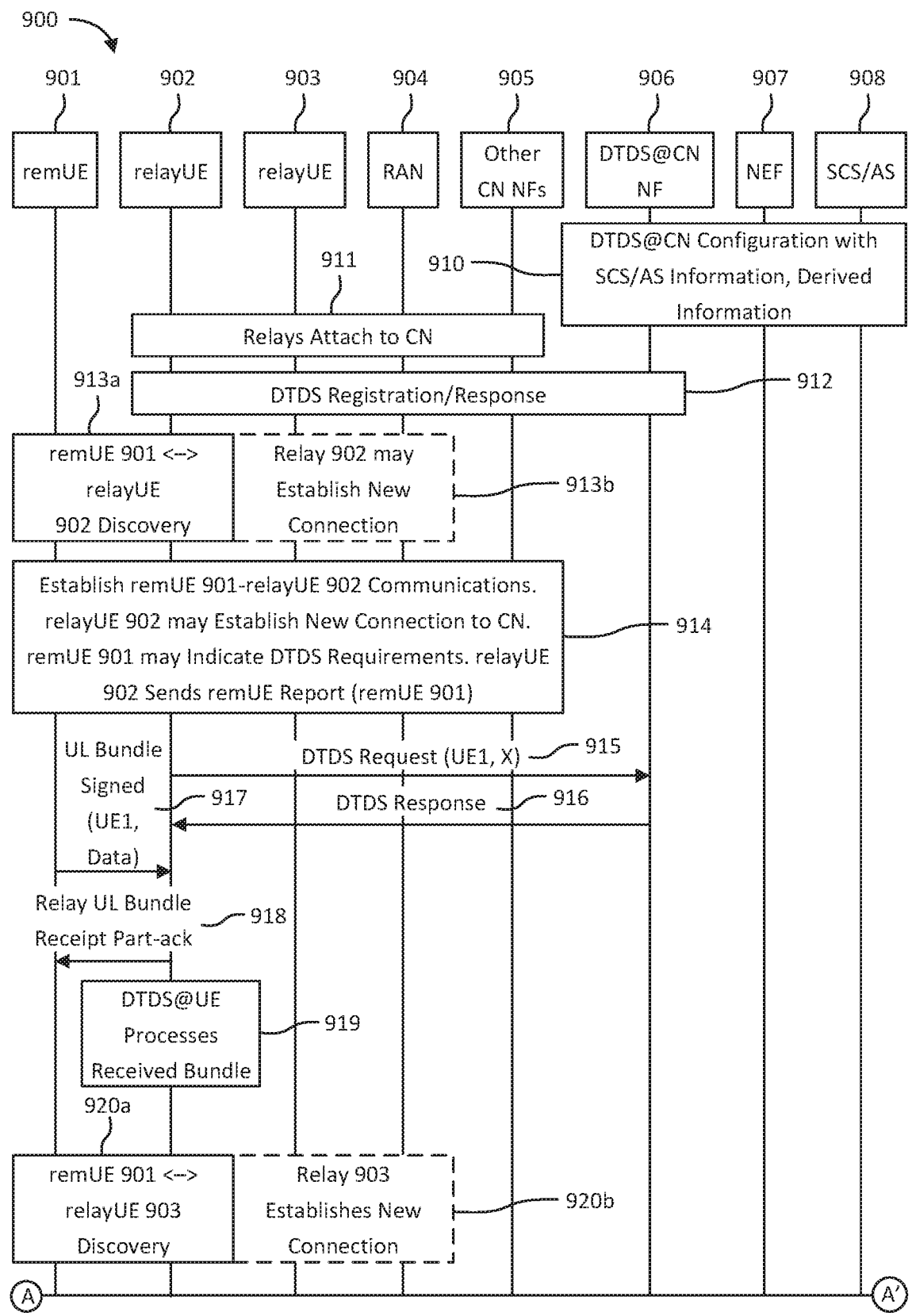
FIG. 9 is a diagram of an example procedure for UL delay tolerant data sent by remUEs via relayUEs and the CN to a SCS/AS, which may be used in combination with any of the embodiments described herein.
Figure 9:
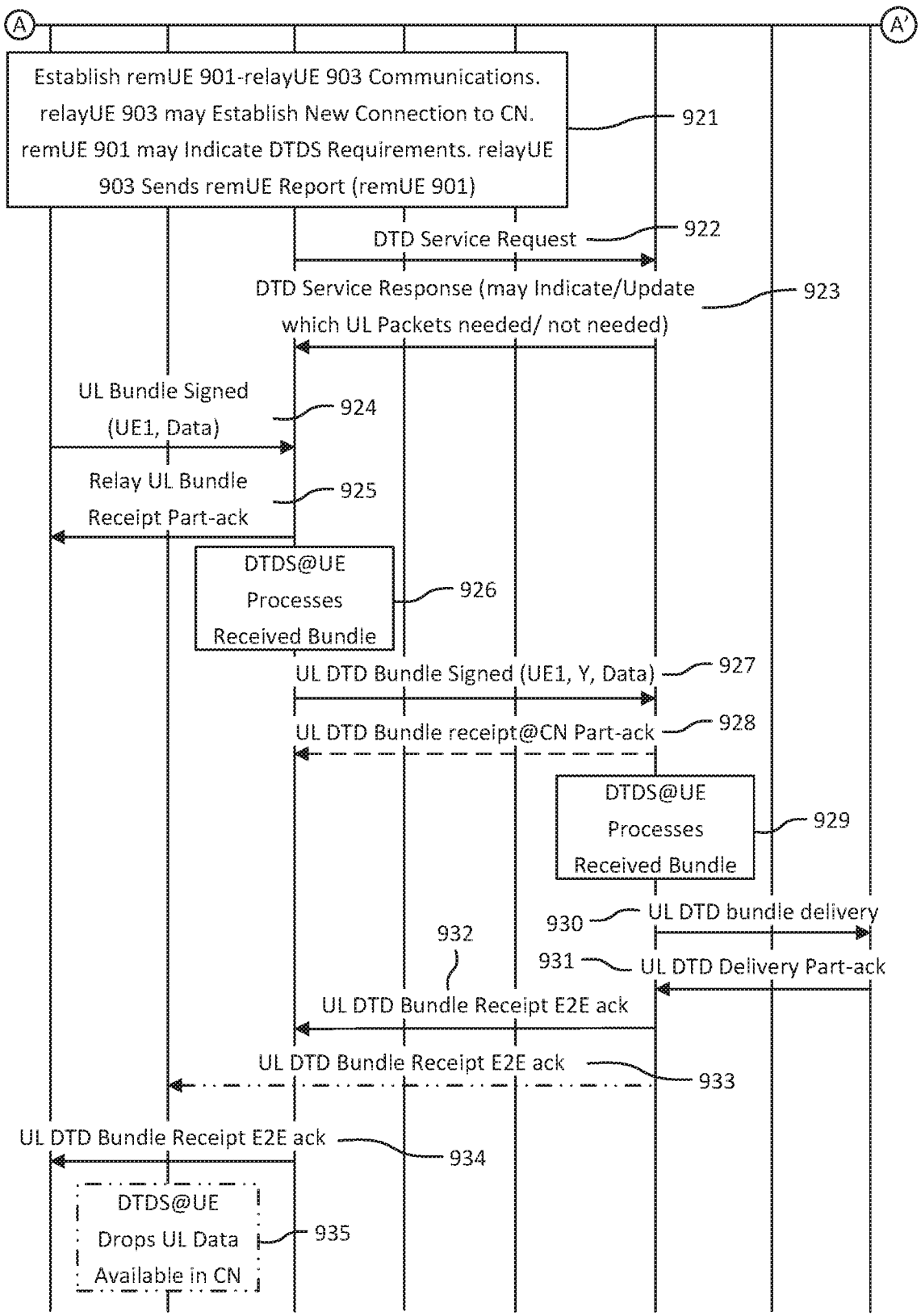

FIG. 9 is a diagram of an example procedure 900 for UL delay tolerant data sent by remUEs via relayUEs and the CN to a SCS/AS, which may be used in combination with any of the embodiments described herein. A similar procedure may be applied to UEs connected directly to CN without a relay. For consistency and clarity, the step notation and order of the example procedure 800 of FIG. 8 is retained in the example procedure 900 of FIG. 9, and therefore, the steps may not be described below sequentially.

In the example of FIG. 9, remUE 901 sends a data bundle via a first relay (e.g., relayUE 902), after which it establishes communications with a second relay (e.g., relayUE 903), before having an acknowledgment of the bundle being received at the destination SCS/AS 908. In this example, the remUE 901 may re-transmit the bundle through the second relay (e.g., relayUE 903) in order to increase the chances of the data arriving at the destination, since the relayUEs may also be without coverage for extended period of time.

The example procedure 900 of FIG. 9 depicts how the data duplication is resolved either by the DTDS@UE service or by the DTDS@CN service. Where the duplication may be resolved depends on the service implementation and capabilities, timing of the data arrival at different entities, etc.

The example procedure 900 of FIG. 9 depicts the following functionality: DTDS@CN NF 906 may be able to predict locations/trajectories of remUEs and relayUEs, based on which it proactively configures DTDS@UE for upcoming transmissions, informs DTDS@UE which UL data has already been received by the CN, etc. This information may then be used by DTDS@UE to drop duplicates, which saves air interface resources. The proactive DTDS@UE configurations may also be done in bulk and at convenient times, optimizing resource use.

Referring to FIG. 9, DTDS@CN NF 906 service may be configured by SCS 908 for the services needed and derive information needed for providing its services (step 910). relayUE 902 may attach to the CN and other CN NFs 905 via RAN 904 (step 911). relayUE 902 may send a DTDS registration message as described above, and the DTDS@CN NF 906 may send a DTDS registration response message to the relayUE 902 (step 912).

Discovery between remUE 901 and relayUE 902 may then be performed (step 913a) and relayUE 902 may establish new connections with the network via RAN 904 for its relay role (step 913b). The remUE 901 to relayUE 902 communications may then be established (step 914). When establishing communications with remUE 901, relayUE 902 may send a report with ProSe UE ID, IP information, etc. to the CN for its communications with remUE 901 and requests services from DTDS@CN NF 906. relayUE 902 may be provided with information about the DTDSs needed at the relay, including, for example, information about the DTDtags already received by DTDS@CN NF 906. relayUE 902 may send a DTDS request to DTDS@CN NF 906 (step 915), which may send a DTDS response to relayUE 902 (step 916). These steps effectively set up the connectionless UL data communication mode.

In one example, remUE 901 may send uplink data to relayUE 902 with one or more data bundles, including a DTDtag per bundle (or an indicator that a DTDtag applies to multiple bundles) (step 917).

relayUE 902 may use information about the DTDSs needed at the relay, such as that sent in step 917, to evaluate how to process DTD from remUE 901 (step 919). For example, relayUE 902 may:

Decide to drop the bundle if it does not meet the delay tolerance parameters, e.g. exceeds max delivery delay calculated from data generation time, etc.;

Decide to drop the bundle if it does not meet the path constraints (relayUE 902 is not allowed in the path), or it does not match the information type, data size constraints, communication type etc.;

Decide that it should be buffered for a while in order to perform a requested service, e.g. error correction or aggregation (The aggregation may be of bundles based on either origin or destination, or may include completely unrelated bundles, for the purpose of optimizing its UL air interface. Afterwards the data may be queued for delivery to the CN); and/or Decide to drop the bundle if it has already been received by DTDS@CN and duplication removal has been requested.

In this example the bundle is not dropped, but it not be delivered to the CN due to network coverage loss at relayUE 902.

If the bundle is not dropped, relayUE 902 may respond with an acknowledgment of receipt of the data bundle (step 918). This is considered a partial-ack because it provides the originator with knowledge that the bundle was delivered only to the next hop. Depending on implementation, DTDSs may rely on part-acks, end-to-end acks, or a combination of both.

remUE 901 may discover another relay, relayUE 903 and relayUE 902 may not be able to forward the received data bundle to the CN for a long time duration, for example, when relayUE 902 loses coverage. Discovery between remUE 901 and relayUE 903 may then be performed (step 920*a*) and relayUE 903 may establish new connections with the network via RAN 904 for its relay role (step 920*b*). The remUE 901 to relayUE 903 communications may then be established (step 921). When establishing communications with remUE 901, relayUE 903 may send a report with ProSe UE ID, IP information, etc. to the CN for its communications with remUE 901 and requests services from DTDS@CN NF 906. relayUE 903 may be provided with information about the DTDSs needed at the relay, including, for example, information about the DTDtags already received by DTDS@CN NF 906. relayUE 903 may send a DTDS request to DTDS@CN NF 906 (step 922), which may send a DTDS response to relayUE 903 (step 923). Since remUE 901 received only a partial ack at step 925, remUE 901 may re-send the same data bundle via relayUE 903 in order to maximize chances of data receipt at the destination (step 924). The same bundle may be sent in the uplink to relayUE 903 with the same DTDtag per bundle. relayUE 903 may respond with a partial-ack indicating receipt of the data bundle (step 925).

relayUE 903 may process the received bundle (step 926), similarly as performed at relayUE 902 in step 919. In this case, the data is queued for delivery to the CN.

relayUE 903 may send the data bundle to DTDS@CN NF 906 service in the CN (step 927). In some embodiments, DTDS@CN NF 906 may respond with a partial-ack indicating the receipt of the data bundle (step 928).

DTDS@CN NF 906 may process and record the received bundle (step 929). If the same bundle is later sent by relayUE 901 and duplication removal has been requested, DTDS@CN NF 906 may drop the later copies, use them for error correction, etc. Depending on the level of service requested from the SCS/AS 908 during configuration, DTDS@CN NF 906 may make determinations similar to those described in step 919. DTDS@CN NF 906 may also provide additional services. For example, remUE 901 (or DTDS@UE) may group bundles with different SC S/AS destinations in order to optimize the air interface use. DTDS@CN NF 906 may ungroup the bundles and forward the UL data accordingly. Moreover, DTDS@CN NF 906 may be able to determine which relays are likely to receive bundles from remUE 901, in order to inform them of the bundles already received in CN. In order to provide this functionality, DTDS@CN NF 906 may:

Keep track of relays that have been used by the remUE and include these in a candidate relay list, which is renewed periodically;

Be pre-configured with a candidate relay list by SCS/AS (This may be done in the initial DTDS configuration (step 910, Table 1 and parameters such as data path constraints, communication scheduling, service geographical information) or later updates);

Be provided by DTDS@UE with remUE 901 generated information through DTD-service request message (step 915, Table 4, parameters such as scheduling info, geographical info); and/or Use analytics and location information available in the CN to determine a probable path and match it with known/anticipated relay locations.

DTDS@CN NF 906 may send the received data bundle to the destination SCS/AS 908 (step 930). In some embodiments, SCS/AS 908 may respond with a partial-ack indicating the receipt of the data bundle (step 931).

Since the data bundle has been delivered to the destination, DTDS@CN NF 906 may send an acknowledgment of the end-to-end delivery of the data bundle to the relay it received it from, (i.e. relayUE 903) (step 932). In some embodiments, DTDS@CN NF 906 may proactively informs other relays which are likely to receive bundles from remUE 901 that the bundle has already been received in CN. This may be achieved by sending the end-to-end acknowledgment to other relays (e.g., relayUE 902) (step 933), or it may be provided via regular configuration updates sent to DTDS@UE of the target relays.

relayUE 903 may inform remUE 901 of the end-to-end delivery of the data bundle (step 934). If the remUE 901 to relayUE 903 communications is no longer active, based on step 933, other relays may be able to forward this acknowledgment, even if they were not in the UL delivery path.

Based on step 933 relay 901 may be able to drop the bundle received and not yet transmitted, because it knows it has already been delivered to the destination (step 935).

Figure 10:
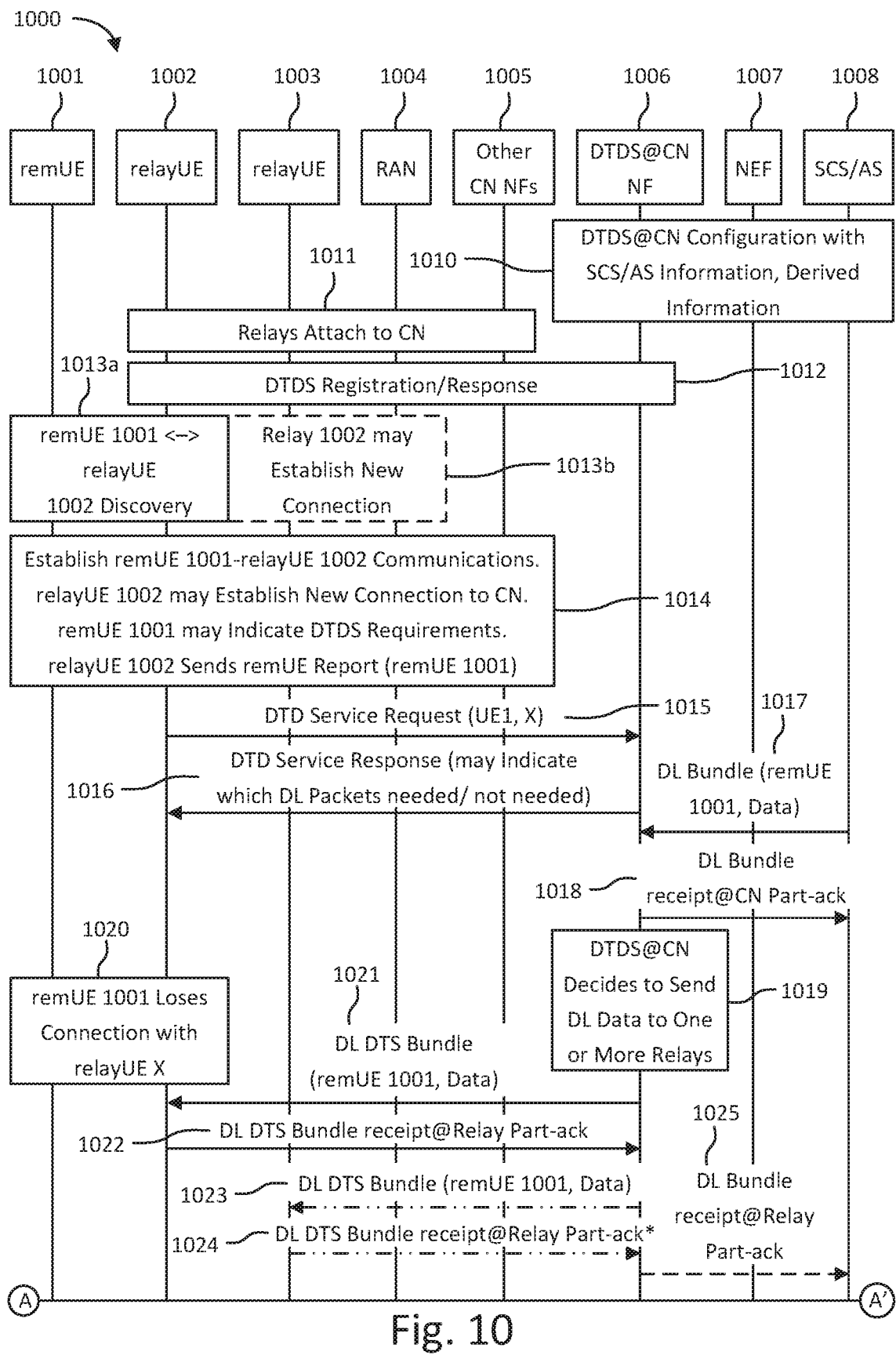
FIG. 10 is a diagram of an example procedure 1000 for DL delay tolerant data being sent by SCS/AS via CN and relay UEs to remUEs, which may be used in combination with any of the embodiments described herein.
Figure 10:
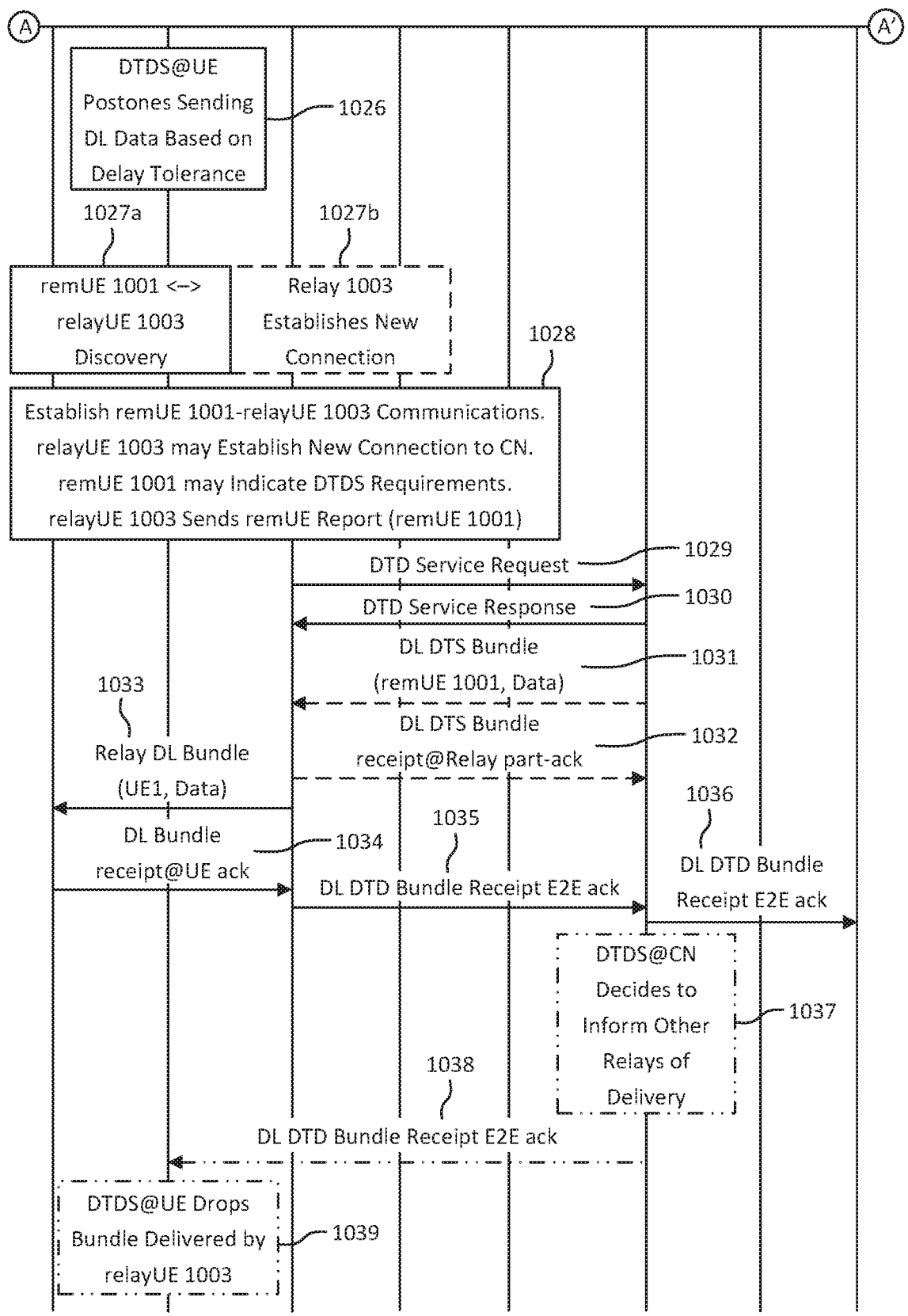

FIG. 10 is a diagram of an example procedure 1000 for DL delay tolerant data being sent by SCS/AS via CN and relay UEs to remUEs, which may be used in combination with any of the embodiments described herein. A similar procedure may be applied to UEs connected directly to CN, without a relay. For consistency and clarity, the step notation and order of the example procedure 800 of FIG. 8 is retained in the example procedure 1000 of FIG. 10, and therefore, the steps may not be described below sequentially.

In the example of FIG. 10, a DL data bundle is provided by SCS/AS 1008 to the CN for delivery to the end remUE 1001. Although relayUE 1002 was configured to provide services to remUE 1001 at the time the DL data transfer was initiated, in this case it is assumed that remUE 1001 establishes communications with a different relay, relayUE 1003, before it receives the data from relayUE 1002. FIG. 10 also depicts the following functionality: DTDS@CN NF 1006 may be able to predict locations/trajectories of remUEs and relayUEs, based on proactively sending DL data to more than one relay in advance.

Referring to FIG. 10, DTDS@CN NF 1006 service may be configured by SCS 1008 for the services needed and derive information needed for providing its services (step 1010). relayUE 1002 may attach to the CN and other CN NFs 1005 via RAN 1004 (step 1011). relayUE 1002 may send a DTDS registration message as described above, and the DTDS@CN NF 1006 may send a DTDS registration response message to the relayUE 1002 (step 1012). Discovery between remUE 1001 and relayUE 1002 may then be performed (step 1013a) and relayUE 1002 may establish new connections with the network via RAN 1004 for its relay role (step 1013b). The remUE 1001 to relayUE 1002 communications may then be established (step 1014). When establishing communications with remUE 1001, relayUE 1002 may send a report with ProSe UE ID (or equivalent), IP information, etc. to the CN for its communications with remUE 1001 and requests services from DTDS@CN NF 1006. relayUE 1002 may be provided with information about the DTDSs needed at the relay, including, for example, information about the DTDtags already received by DTDS@CN NF 1006. relayUE 1002 may send a DTDS request to DTDS@CN NF 1006 (step 1015), which may send a DTDS response to relayUE 1002 (step 1016). These steps effectively set up the connectionless DL data communication mode.

SCS/AS 1008 may send, to DTDS@CN NF 1006, DL data for remUE 1001 with one or more data bundles, including a DTDtag per bundle (or an indicator that a DTDtag applies to multiple bundles) (step 1017). A partial ack for delivery to the CN may be sent, from DTDS@CN NF 1006, to SCS/AS 1008 (step 1018).

DTDS@CN NF 1006 may determine how to forward the DL bundle based on the information received about the destination remUE 1001 (step 1019). Depending on the DTDSs configured by the SCS/AS 1008 for communication with remUE 1001 and on its capabilities, DTDS@CN NF 1006 may decide to send the bundle to other relays, in addition to relayUE 1002 that most recently registered to provide DTDSs for remUE 1001. It is assumed in the example of FIG. 10 that during this time remUE 1001 loses communications with relayUE 1002, and the network is not aware (step 1020).

DTDS@CN may send the DL data bundle to relayUE 1001 (step 1021). In some embodiments relayUE 1001 may respond with a partial-ack indicating the receipt of the data bundle (step 1022). Based on the decisions in step 1019, relay DTDS@CN NF 1006 may also send the DL data bundle to relayUE 1003 (step 1023). relayUE 1003 may respond with a partial-ack indicating the receipt of the data bundle (step 1024).

Depending on implementation and the configuration from SCS/AS 1008, DTDS@CN NF 1006 may send a partial-ack to SCS/AS 1008 indicating the receipt of the data bundle at one or more relays (step 1025).

relayUE 1002 (e.g., via DTDS@UE) may process the received data based on the pre-configured service requirements, such as for example, by determining how long the data may be buffered and still meet the delay tolerance requirements (step 1026). If aggregation services are configured, the relay may wait to aggregate the bundle with other bundles (e.g. from different SCS/ASs) before delivery to remUE 1001. The same type of processing occurs at all relays receiving the DL data, if more than one copy was sent.

remUE 1001 may then discover relayUE 1003. Discovery between remUE 1001 and relayUE 1003 may then be performed (step 1027a) and relayUE 1003 may establish new connections with the network via RAN 1004 for its relay role (step 1027b). The remUE 1001 to relayUE 1003 communications may then be established (step 1028). When establishing communications with remUE 1001, relayUE 1003 may sends a report with ProSe UE IDs (or equivalent), IP information (if applicable), etc. to the CN for its communications with remUE 1001 and requests services from DTDS@CN NF 1006. relayUE 1003 may be provided with information about the DTDSs needed at the relay, including, for example, information about the DTDtags already received by DTDS@CN NF 1006. relayUE 1003 may send a DTDS request to DTDS@CN NF 1006 (step 1029), which may send a DTDS response to relayUE 1003 (step 1030).

If the DL data bundle was previously not sent to relayUE 1003, DTDS@CN NF 1006 may also send the DL data bundle to relayUE 1003 (step 1030), which may respond with a partial-ack indicating the receipt (step 1031).

relayUE 1003 may send the received data bundle to the destination remUE 1001 (step 1033), which may respond with a partial-ack indicating the receipt of the DL data bundle (step 1034).

Since the data bundle has been delivered to the destination, relayUE 1003 (e.g., via DTDS@UE) may send an acknowledgment of the end-to-end delivery of the data bundle to the DTDS@CN NF 1006 (step 1035). DTDS@CN NF 1006 may informs SCS/AS of the end-to-end delivery of the data bundle (step 1036). Then, based on step 1035, DTDS@CN NF 1006 may decide to inform other relays to drop the bundle received and not yet transmitted, because it knows it has already been delivered to the destination (step 1037).

DTDS@CN may inform relayUE 1002 of the end-to-end delivery of the data bundle via relayUE 1003 (step 1038). This step may use an ack or partial-ack message, or may reuse the DTD service request response message to inform of delivered bundles.

The DTDS@UE of relayUE 1002 may drop the bundle not yet transmitted because it knows it has already been delivered to the destination (step 1039).

Upon receiving a DL bundle request from the SCS/AS 1008, DTDS@CN NF 1006 may first page the candidate relayUEs, if these are in IDLE mode. It may provide a list of relayUEs to the MME or AMF, which may then page the relayUEs. This may be a DTD type of paging (e.g. a DTDS page) that commands the relayUEs to stay connected until the DTDS operation that triggered the paging is complete.

DTDS capabilities may be used to enable delay tolerant paging procedures for remUEs or capillary devices. Delay tolerant paging may be useful for massive IoT deployments as an alternative to both location services and paging. It may also be used for sensors that are connected to relayUEs via technologies other than 3GPP, if it has a unique identity in the CN. If the SCS/AS is tracking an asset/sensor, it may configure the network to query the last sensor that has been interacted with and provide a notification.

A delay tolerant paging procedure may be similar to the DL data delivery procedure of FIG. 10, except that instead of providing a DL data bundle, the SCS/AS may provide a paging request with a remote or capillary UE ID. For instance, the DL DTS bundle request and DL DTS bundle receipt messages of FIG. 10 may be replaced by a DTDS paging request and DTS paging receipt messages, respectively. The DTDS paging request message may include parameters including but not limited to the following listed in Table 5:

TABLE 5

DTDS Paging request

| Field | Description |
| --- | --- |
| UE IDs to be paged | UE IDs of remUE to be paged. This may include IMSI, ProSe IDs if applicable, DTDS Endpoint ID, capillary device ID, etc. |
| Notification type | The notification to be delivered back to SCS/AS should be based on, for example: Responses from any relayUEs that provide a connection timestamp within a timeframe Response only from a single (first) relayUE connected to the remUE at the time of DT paging request. Responses from all relayUEs connected to the remUE after DT paging request and within a time window. Responses from all UEs that discovered the remUE within a time window, even if not connected. Responses from all relayUEs that accepted the request, assuming that the remUE will contact SCS/AS based on request. This attribute may also indicate what technology or protocol to be used in the peer-to-peer paging, the discovery type to be used, e.g. restricted vs. unrestricted, which model (if ProSe), etc. |
| Direct communication type | This parameter is related to the above, and it indicates if one-to-many direct communications or one-to-one communications may be used. |
| DL DTD data | DL DTD to be delivered with the paging |
| Delay tolerance parameters | Delay tolerance information, such as: maximum paging delay or time window(s). |
| Other service information | Other service information includes: Geographical information about where to page remUEs, specific relayUEs to be used for paging. |
| Response Type | This parameter tells the core network how to deal with the receipt messages from multiple relayUEs. For example: Treat each receipt message from the individual relayUEs independently - and potentially send multiple responses to the SCS/AS Aggregate receipts from multiple relayUEs and send a single response to the SCS/AS |

Upon receiving a DL paging request from the SCS/AS, the DTDS@CN may first page the candidate relayUEs, if these are in IDLE mode. The DTDS@CN may provide a list of relayUEs to the MME or AMF, which may then page the relayUEs. This may be a DTDS type of paging (e.g. a DTDS page) that commands the relayUEs to stay connected until the DTDS operation that triggered the paging is complete.

Upon receiving the paging message, the relay UE may contact the DTDS and receive a list of UEs to be paged. The relay UE may respond to the DTDS with a list of UEs and the list may include indications of whether the relay UE can currently reach the UEs on the list of indication of when the relay UE was last in contact with the UEs on the list. The DTDS may aggregate responses from multiple relay UEs and forward this information to the SCS/AS.

Figure 11:
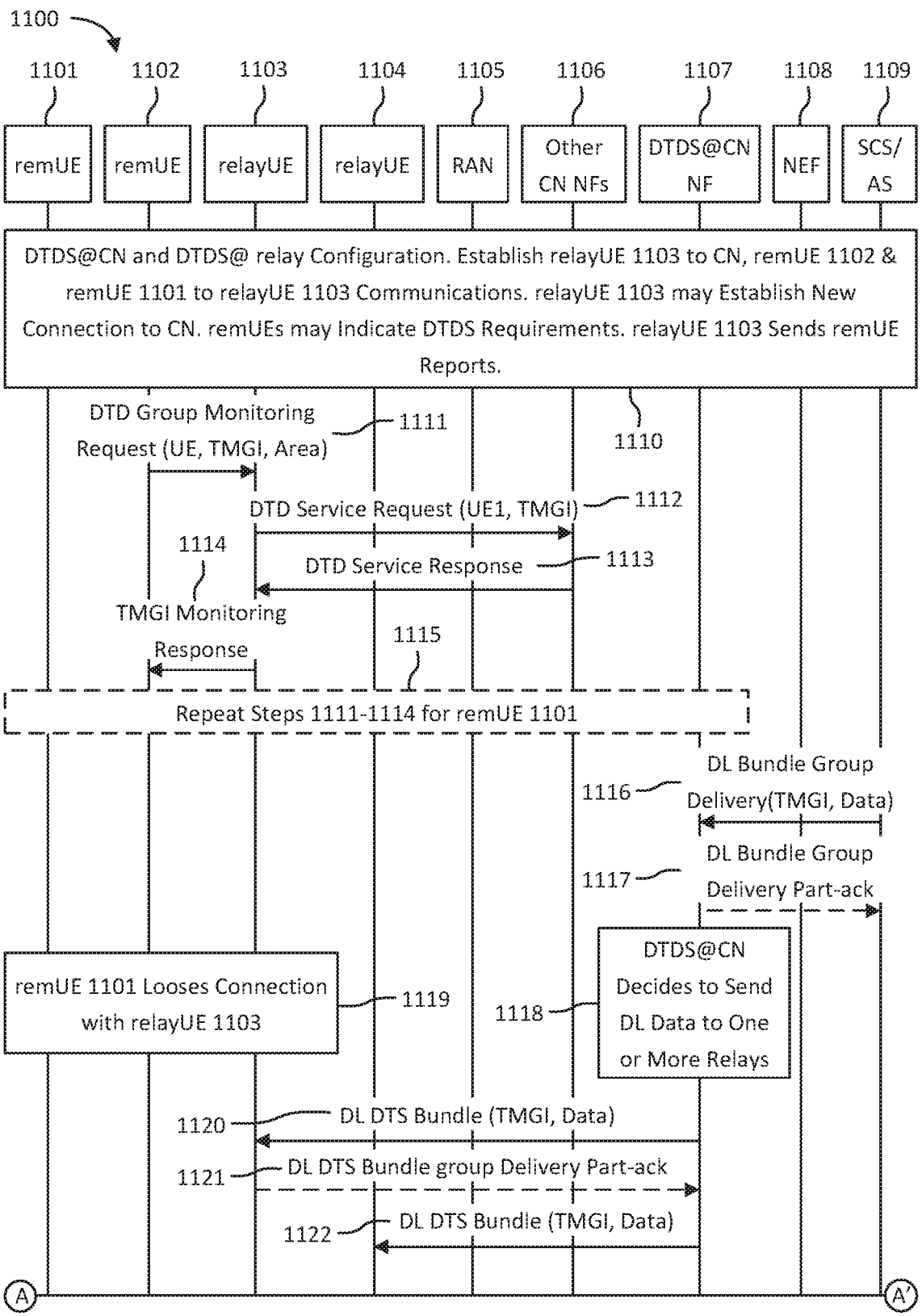
FIG. 11 is an example procedure for group or MBMS delay tolerant data sent by a SCS/AS via the CN and relay UEs to remUEs, which may be used in combination with any of the embodiments described herein.
Figure 11:
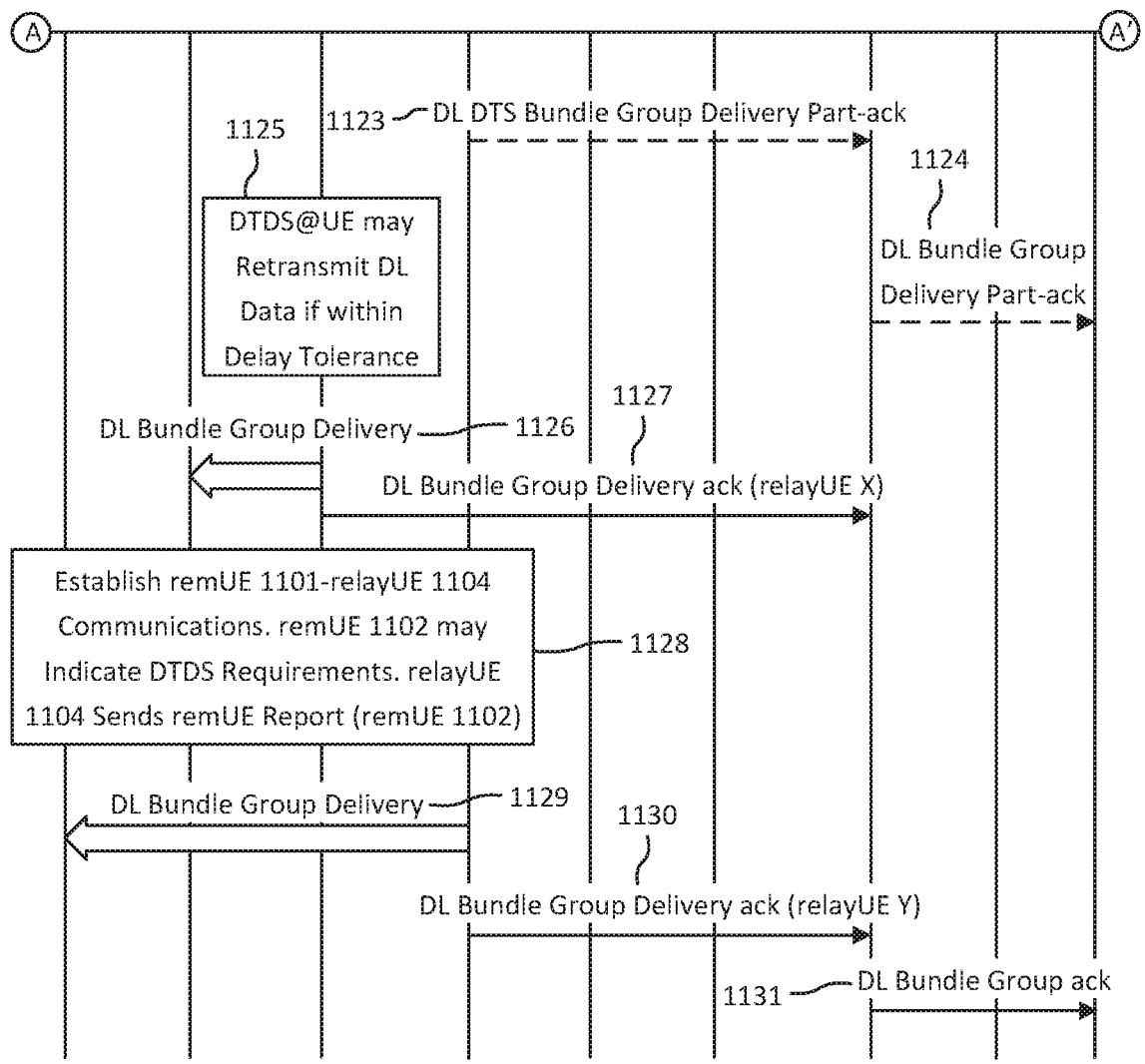

FIG. 11 is an example procedure 1100 for group or MBMS delay tolerant data sent by a SCS/AS via the CN and relay UEs to remUEs, which may be used in combination with any of the embodiments described herein. A similar procedure may be applied to UEs connected directly to CN, without a relay. DTDS capabilities may also be used to enable group or MBMS transmissions to the remUEs. In the example of FIG. 11, TMGIs, MBMS SAIs and ProSe per-packet priority are assumed to be pre-provisioned or to be communicated by the SCS/AS to the remUEs using out-of-band signaling, e.g. application layer messaging.

The example of FIG. 11 depicts a DL data bundle provided by SCS/AS 1109 to the CN for delivery to the end remUEs (e.g., remUE 1101 and remUE 1102) with a given TMGI. DTDS may determine to which relays to send the DL bundle. Although the two remUEs (e.g., remUE 1101 and remUE 1102) may have last been connected to the same relayUE 1103, DTDS@CN NF 1107 may decide to send the DL bundle to additional relays. For example, it may include relayUE 1104 because it knows that it is likely to communicate with the remUEs (e.g., remUE 1101 and remUE 1102). In this example, remUE 1101 may lose its connection with relayUE 1103 but is able to receive the DL bundle from relayUE 1104.

DTDS@UE of relayUE 1103 may also allow for re-broadcasts of the data, when it is within delay tolerance. The DTDS@UE of relay 1104 implementation may also allow for broadcasting of the data if requested by DTDS@CN NF 1107, even if no remUE registered for TMGI. Also, because UEs belonging to an announced TMGI may receive the relayed eMBMS traffic even without completing the TMGI monitoring request/response procedure, the DTDS@UE of relayUE 1103 may also allow broadcasting the data even if the remUE 1101 requester is no longer connected.

Referring to FIG. 11, similar to the procedures of FIGS. 8-10, relayUE 1103 may attach to the CN. DTDS@CN NF 1107 service may be configured by SCSs for the services needed, and when establishing communications with remUE 1101 and remUE 1102, relayUE 1103 may send a report with ProSe UE IDs (or equivalent), IP information (if applicable), etc. to the CN and requests services from DTDS@CN NF 1107 (step 1110). relayUE 1103 may be provided with information about the DTDSs needed at the relay.

remUE 1102 may send a DTD monitoring request for a given TMGI to relayUE 1103, indicating its own ID, TMGI (step 1111). This may be converted into a DTD service request by the relayUE 1103 and forwarded to DTDS@CN NF 1107 (step 1112). DTDS@CN NF 1107 may send a response relayUE 1103 (step 1113). relayUE 1103 may send a response to remUE 1102 (step 1114).

Steps 1111, 1112, 1113, and 1114 may be repeated for remUE 1101 (step 1115). remUE 1101 may receive the relayed eMBMS traffic even without completing the TMGI monitoring request/response procedure.

SCS/AS 1109 may send DL group data bundles, including a DTDtag per bundle (or an indicator that a DTDtag applies to multiple bundles) (step 1116). A partial ack for delivery to the CN is sent by DTDS@CN NF 1107 to SCS/AS 1109 (step 1117).

DTDS@CN NF 1107 may determine how to forward the DL group bundle based on the information received from SCS/AS 1109 and from remUE 1102 (step 1118). Depending on the TMGI and DTDSs configured by SCS/AS 1109 for communication with remUE 1102 and on its capabilities, the SCS/AS 1109 may decide to send the bundle to other relays, in addition to relayUE 1103, which most recently registered to monitor the TMGI. It may be assumed that during this time remUE 1102 may lose communications with relayUE 1103 and the network is not aware (step 1119).

DTDS@CN may send the DL group data bundle to relayUE 1103 (step 1120). relayUE 1103 may send a partial-ack indicating the receipt of the data bundle (step 1121). Depending on the decisions in 1118, DTDS@CN may send the DL group data bundle to relayUE 1104 (step 1122).

relayUE 1104 may send a partial-ack indicating the receipt of the data bundle (step 1123).

Depending on implementation and the configuration from SCS/AS 1109, DTDS@CN NF 1107 may send a partial-ack to the SCS/AS 1109 indicating the receipt of the data bundle at one or more relays (step 1124).

DTDS@UE of relayUE 1103 may process the received group data based on the pre-configured service requirements (step 1125). For example, relays may calculate how long this data may be buffered and still meet the delay tolerance requirements. If the monitoring requester (remUE 1102) is not currently in communication with relayUE 1103, the relay may decide to still broadcast or re-broadcast data.

relayUE 1103 may send a DL bundle group-delivery (step 1126) and may send a partial-ack indicating the delivery (or responses to it) of the DL data bundle (step 1127).

These steps in the example of FIG. 11 may be accomplished via unicast or multicast signaling to a group of devices and may also be accomplished outside 3GPP signaling.

The DTDS configuration may indicate additional logic to be applied, such as "deliver via unicast until X responses are received" (in this case effectively implementing an anycast/somecast mechanism at the relay).

remUE2 1101 may discover relayUE 1104. Similar to the procedures of FIGS. 8-10, relayUE 1104 may attach to the CN. DTDS@CN NF 1107 service may be configured by SCSs for the services needed, and when establishing communications with remUE 1101, relayUE 1104 may send a report with ProSe UE IDs (or equivalent), IP information (if applicable), etc. to the CN and requests services from DTDS@CN NF 1107 (step 1128). relayUE 1104 may be provided with information about the DTDSs needed at the relay.

Steps 1126 and 1127 are repeated by relayUE 1104 for broadcasting the given DL group bundle and responding to DTDS@CN. relayUE 1104 may send a DL bundle group-delivery (step 1129) and may send a partial-ack indicating the delivery (or responses to it) of the DL data bundle (step 1130). More sophisticated functionality may be implemented if during the DTDS@UE configuration (steps 810, 814, 819 of FIG. 8) additional parameters may be provided for group behavior. For example, the configuration may indicate a conditional logic to be applied, such as "respond to DL bundle group delivery only if more than 5 responses have been received within a time window" (if delivery is unicast).

TABLE 6

DTDS monitoring request

| Field | Description |
| --- | --- |
| User ID | User IDs of remUE |
| Monitored Identifiers | TMGI to be monitored. MBMS SAIs |
| Additional Identifiers | ProSe Layer-2 Group ID, including ProSe Per-Packet Priority |
| DT data information type | Type of information to be communicated, including but not limited to: data size ranges, data type, service type (e.g. measurement, picture, etc.) |
| Delay tolerance parameters | Delay tolerance information, such as: maximum delivery delay through CN, max number of UL bundle duplicates the SCS/AS can resolve itself or max number of UL bundle duplicates it requires the network to resolve, max delivery delay calculated from data generation time, ?? |
| Service geographical information | Geographical information about where the remUEs wants the service offered (this may also be provided by the SCS/AS configuration) |

DTDS@CN NF 1107 may inform SCS/AS 1109 of the completion of the group delivery of the data bundle (step 1131).

Figure 12:
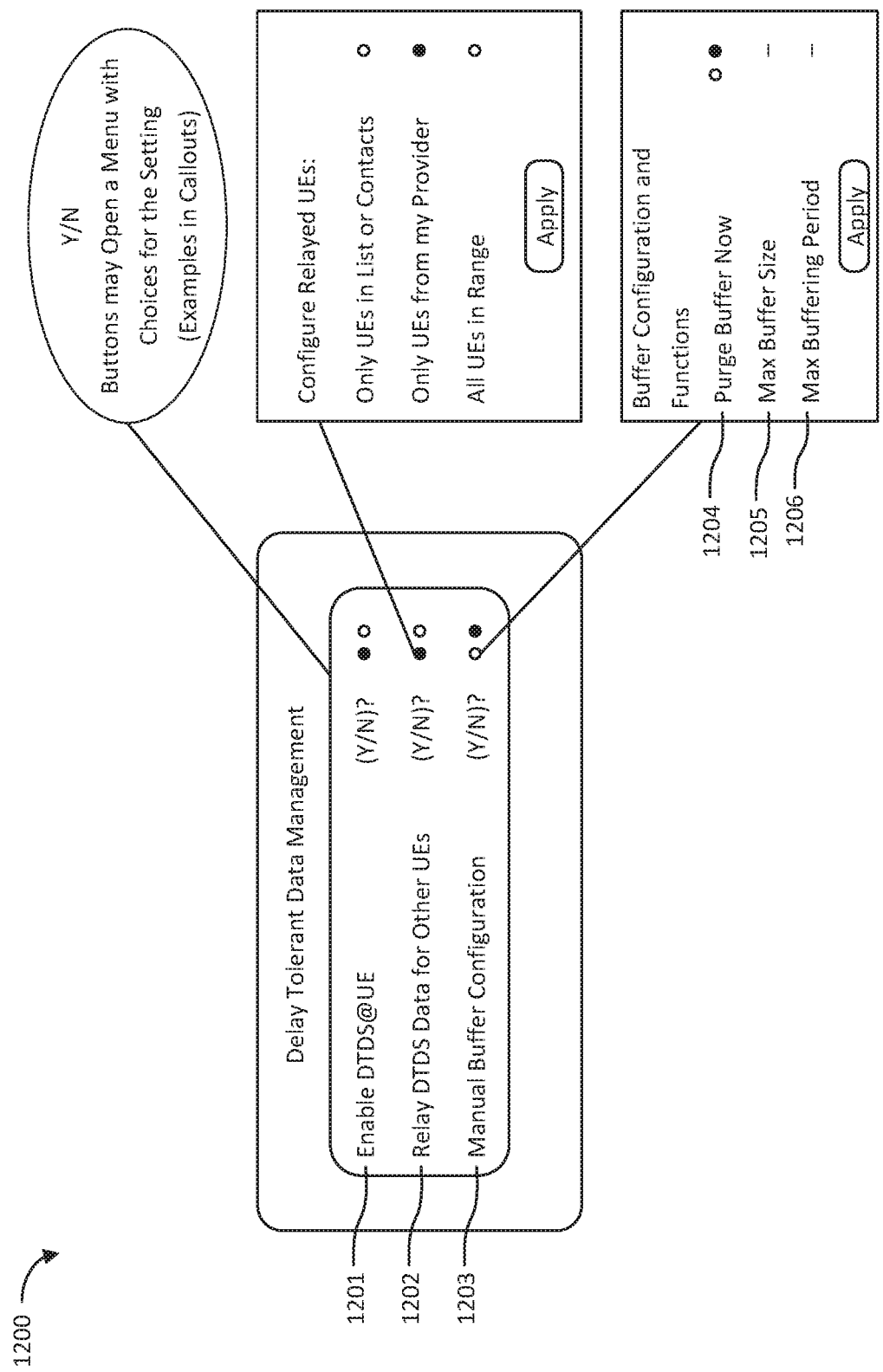
FIG. 12 is a diagram of an example graphical user interface (GUI)

FIG. 12 is a diagram of an example graphical user interface (GUI) 1200. The example GUI 1200 may enable the user to configure the parameters or trigger actions as follows:

Enable the DTDS@UE service for the UE itself 1201. Setting this option may trigger the DTDS Configuration procedure.

Enable UE to relay DTDS data for other UEs 1202. Setting this option may allow configuring which UE's or UE Groups the UE is willing to relay data for.

Enable manual configuration for DTDS parameters, e.g. buffering 1203. Setting this option may trigger:

A Buffer Purge option 1204 that, when selected, causes the UE to purge any data that is has buffered.

A maximum Buffer Size option 1205 that allows the user to limit how much data is buffered in the DTDS@UE service.

A Buffer Time option 1206 that allows the user to configure how long data packets are buffered.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 13A:
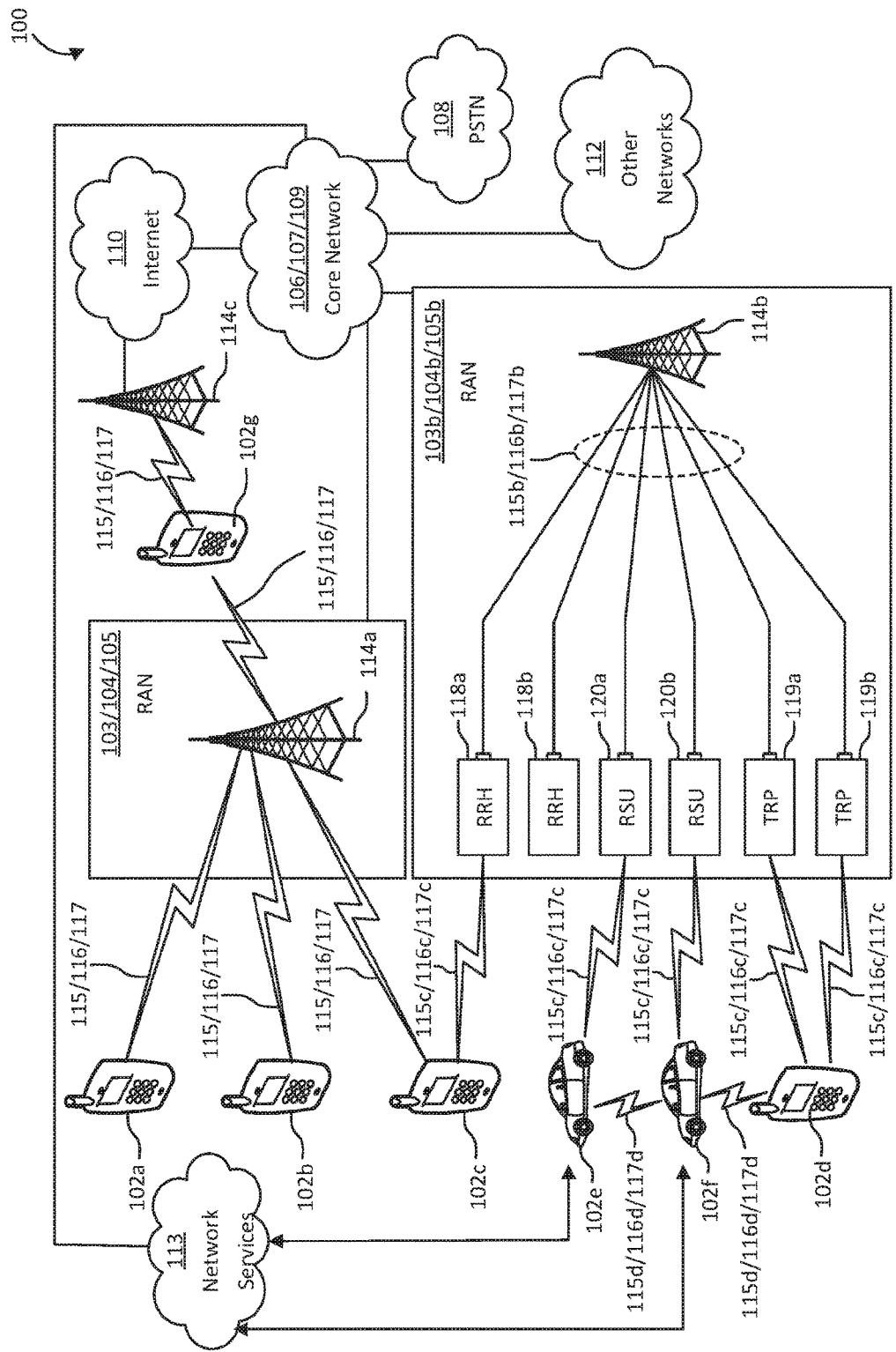
FIG. 13A illustrates an example communications system.

FIG. 13A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/ 105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 13A, each of the WTRUs 102 is depicted in FIGS. 13A-13E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 13A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/ 107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 13A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 13A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 13A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 13A may be configured to communicate with the base station 114a, which may employ a cellular-based radio technology, and with the base station 114c, which may employ an IEEE 802 radio technology.

Although not shown in FIG. 13A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 13B:
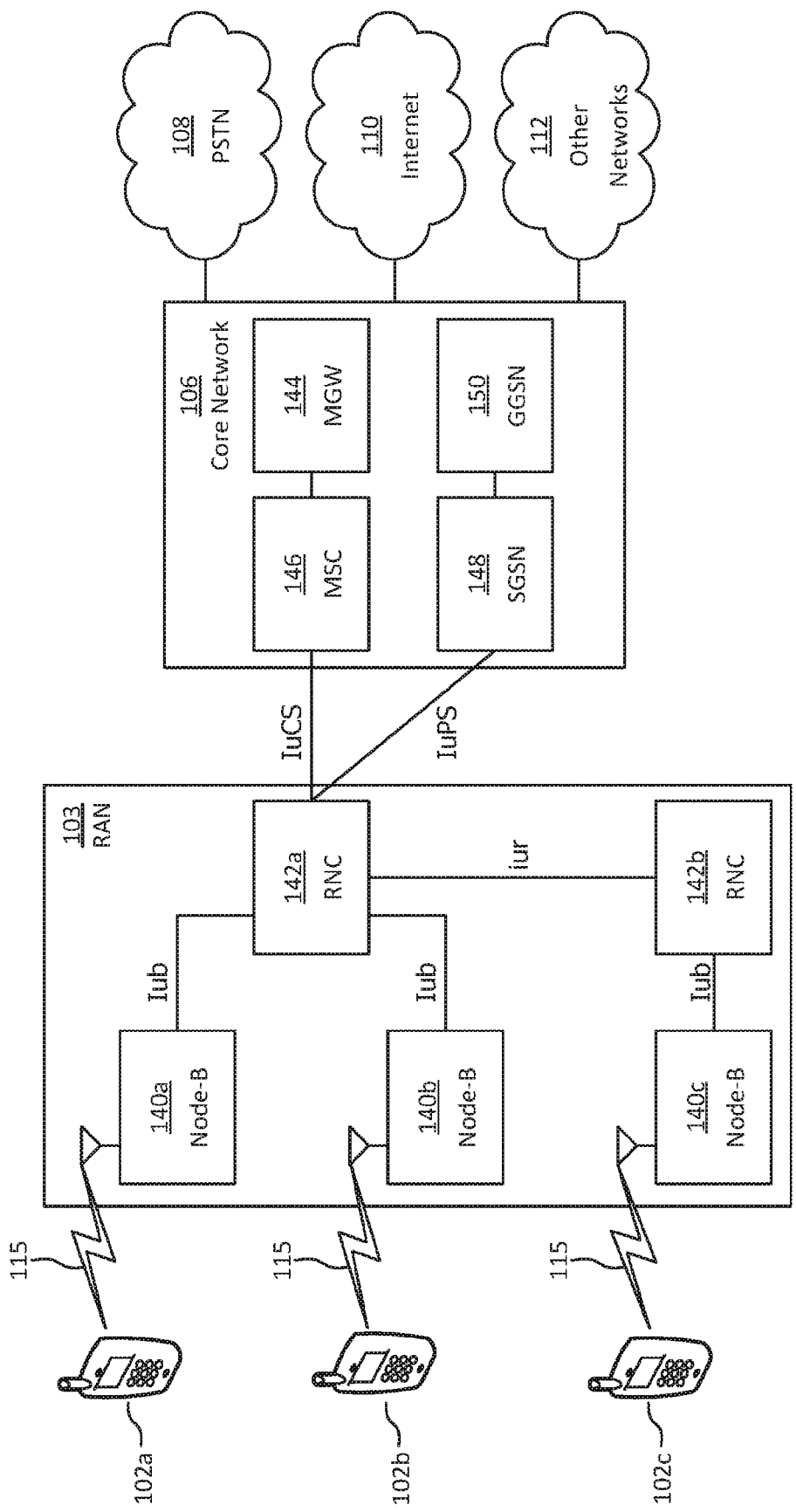
FIG. 13B is a system diagram of an example RAN and core network.

FIG. 13B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 13B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 13B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 13B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 13C:
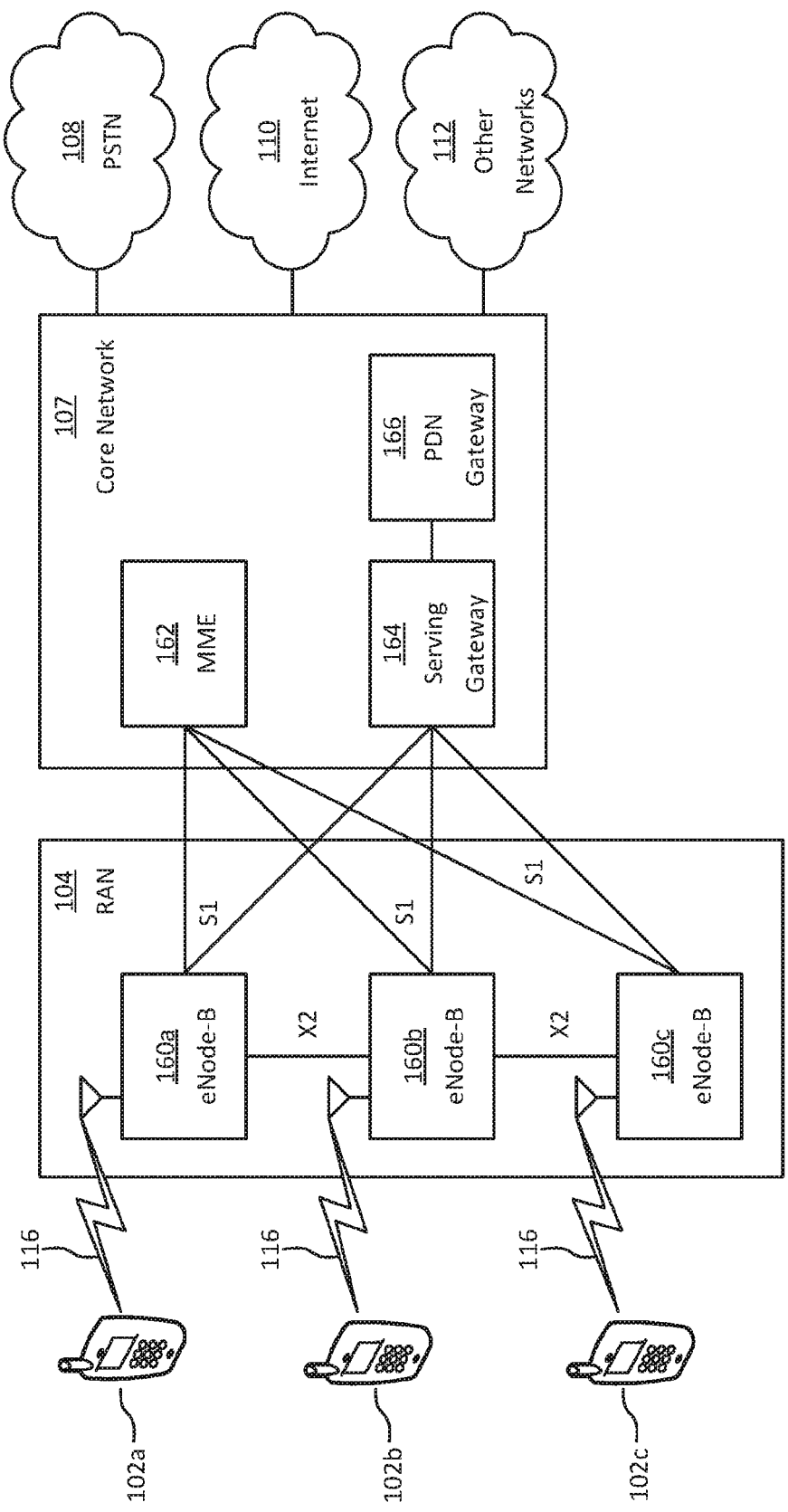
FIG. 13C is a system diagram of another example RAN and core network.

FIG. 13C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 13C, the eNode-Bs 160a, 160b, and 160c may communicate with one another over an X2 interface.

The core network 107 shown in FIG. 13C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 13D:
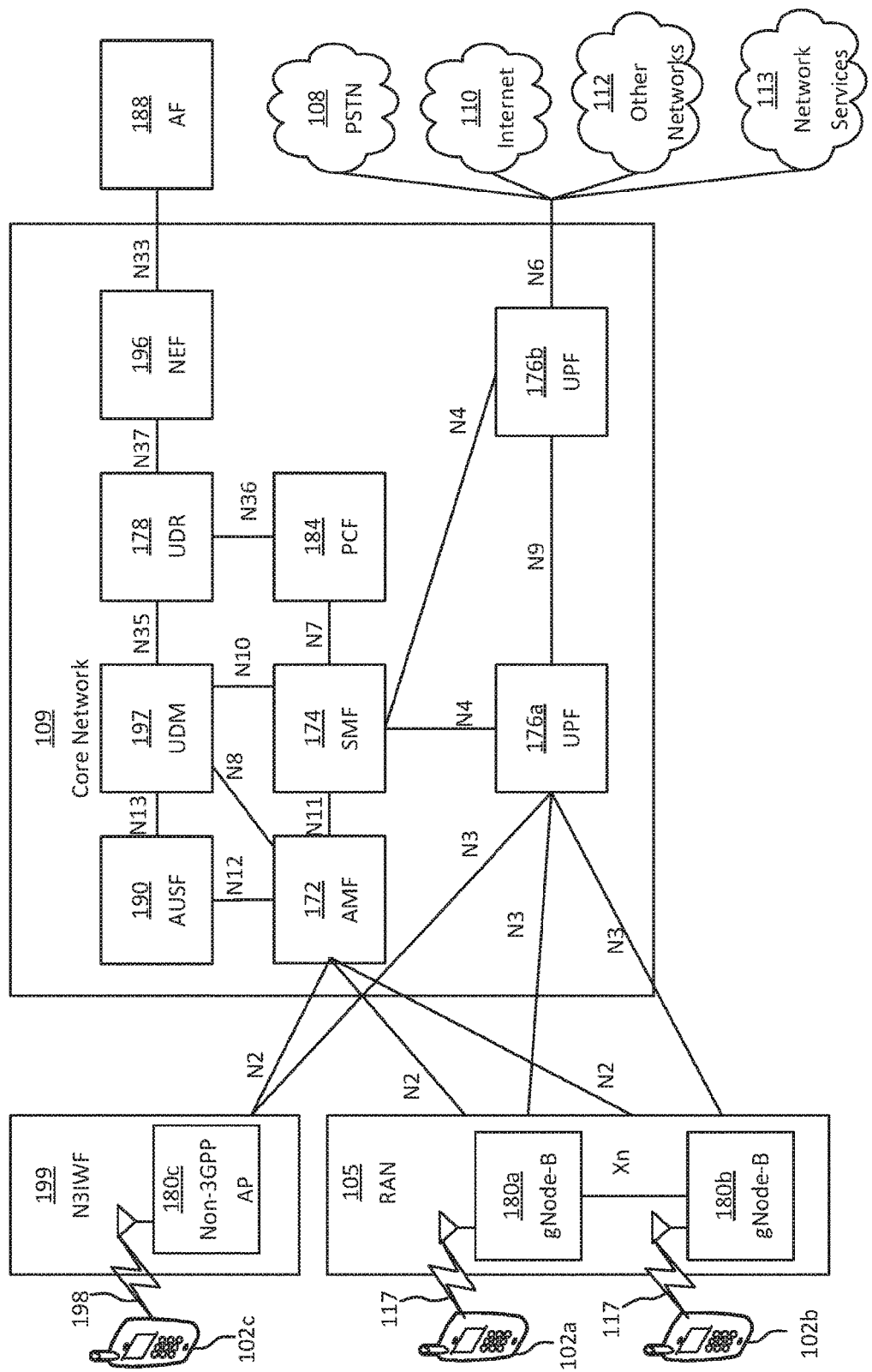
FIG. 13D is a system diagram of another example RAN and core network.

FIG. 13D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated that RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 13D, the gNode-Bs 180a and 180b may communicate with one another over an Xn interface, for example.

The core network 109 shown in FIG. 13D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 13G.

In the example of FIG. 13D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 13D shows that network functions directly connect to one another, however, it should be appreciated that they may communicate via routing agents such as a diameter routing agent or message buses.

In the example of FIG. 13D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 13D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 13D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 13D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 13A, 13C, 13D, and 13E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 13A, 13B, 13C, 13D, and 13E are provided by way of example only, and it is understood that the subject matter disclosed and claimed herein may be embodied or implemented in any similar communication system, whether presently defined or defined in the future.

Figure 13E:
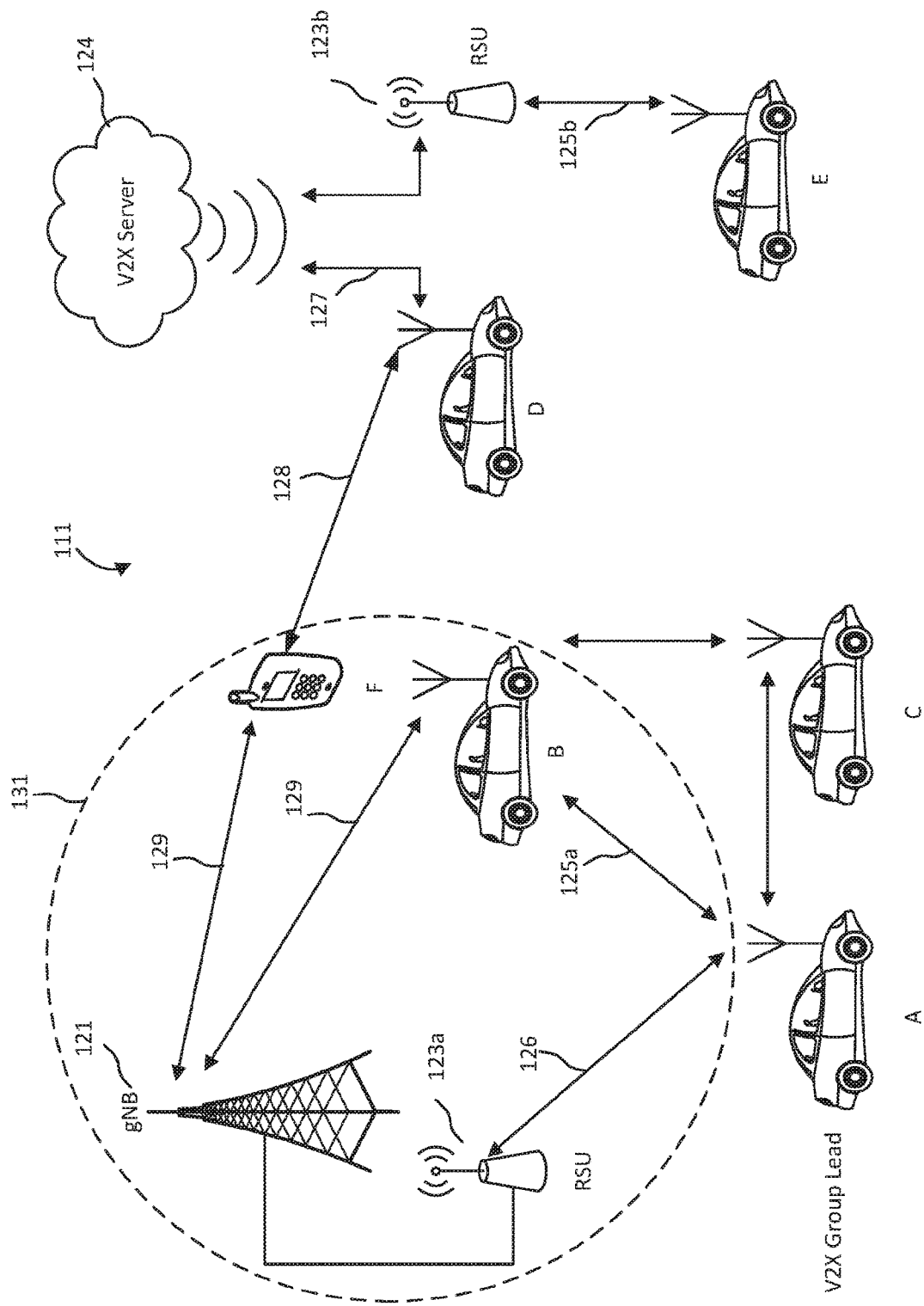
FIG. 13E illustrates another example communications system.

FIG. 13E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 13E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 13E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 13F:
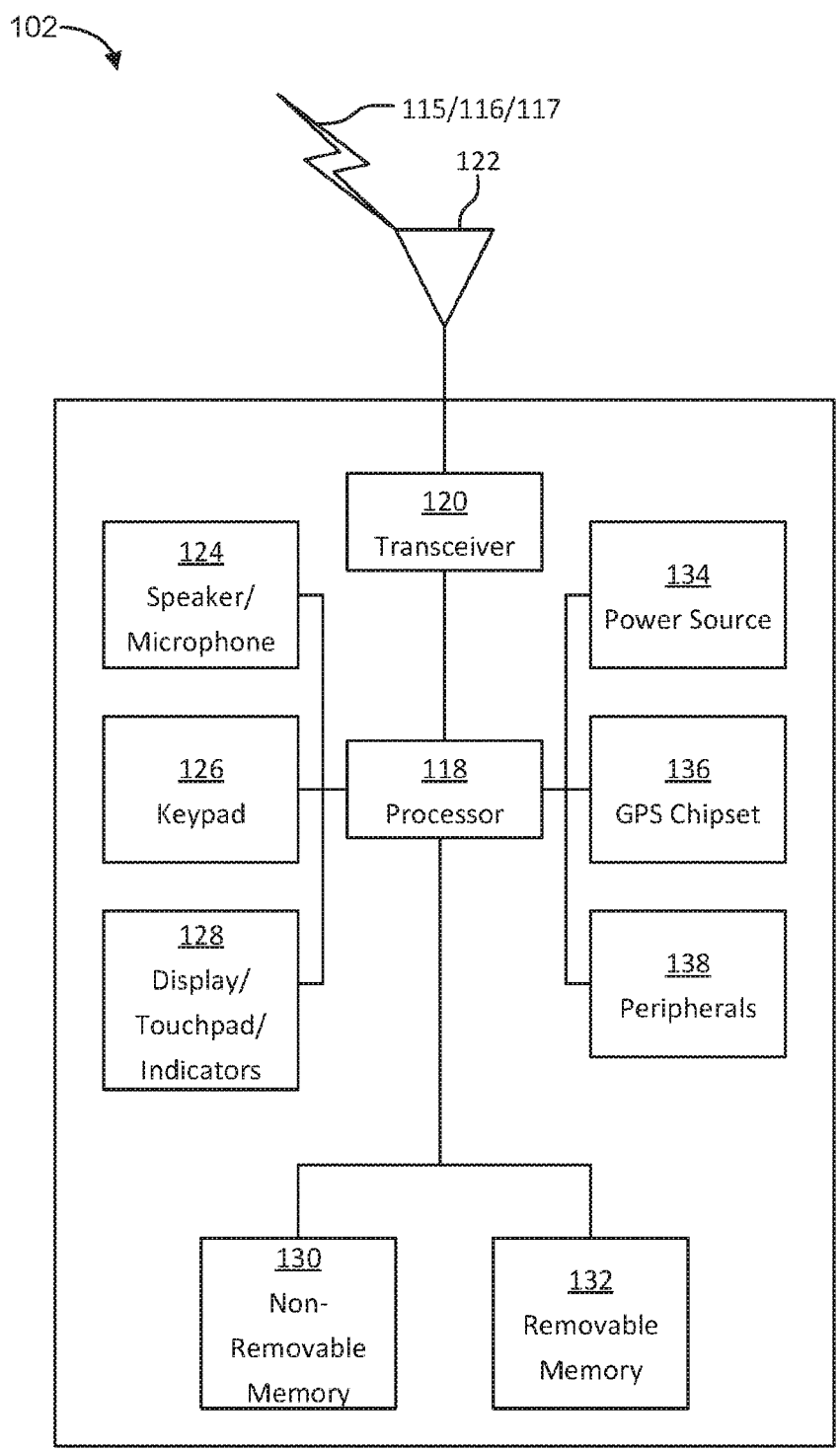
FIG. 13F is a block diagram of an example apparatus, such as a WTRU.

FIG. 13F is a block diagram of an example apparatus or device WTRU 102 that may be configured for wireless communications and operations in accordance with the systems, methods, and apparatuses described herein, such as a WTRU 102 of FIG. 13A, 13B, 13C, 13D, or 13E. As shown in FIG. 13F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 13F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 13A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 13F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 13G:
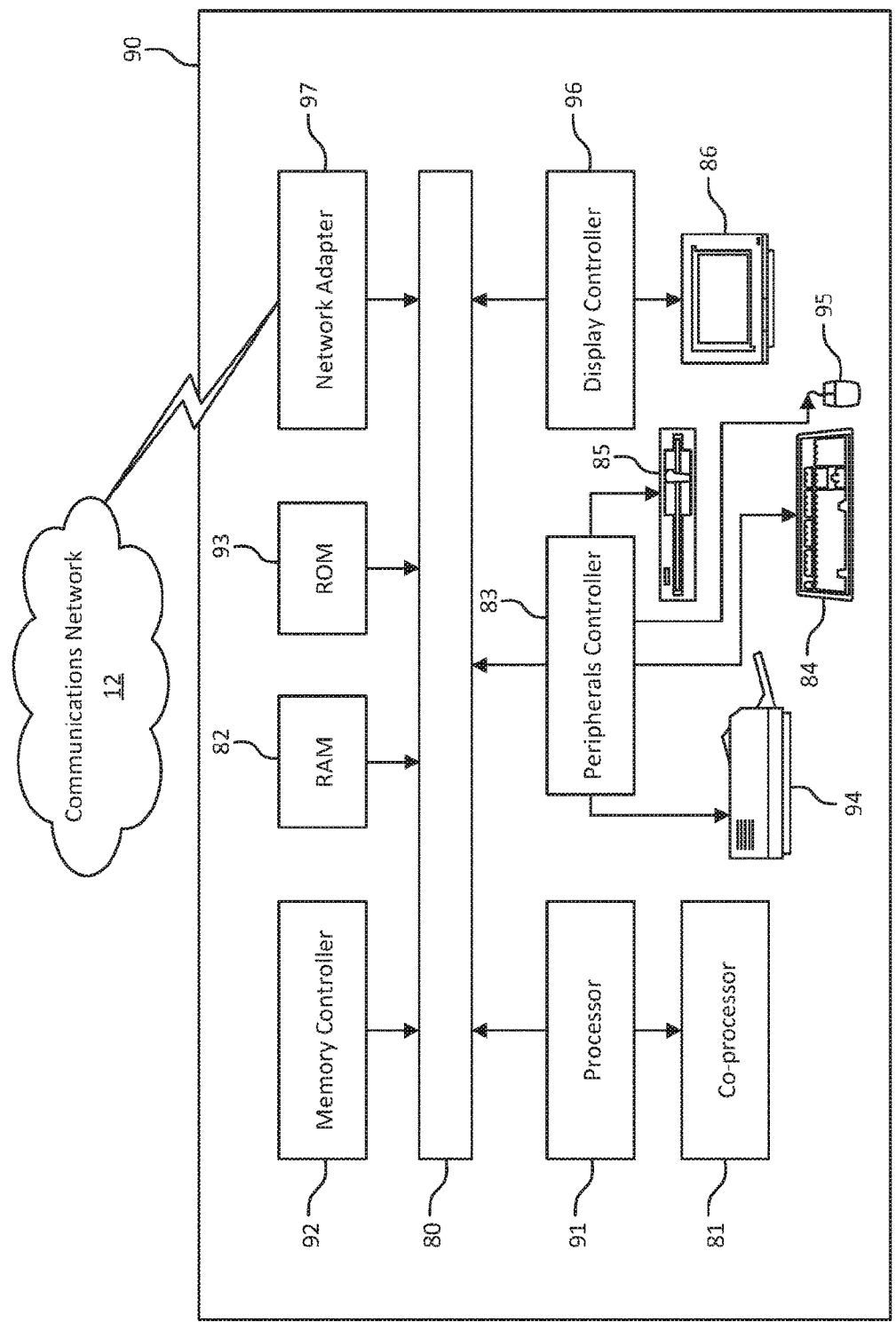
FIG. 13G is a block diagram of an exemplary computing system.

FIG. 13G is a block diagram of an exemplary computing system 90 in which one or more apparatuses of the communications networks illustrated in FIGS. 13A, 13C, 13D and 13E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 13A, 13B, 13C, 13D, and 13E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed:

1. A wireless transmit/receive unit (WTRU), comprising a transceiver and one or more processors, configured to:
   receive, from a first apparatus, configuration information indicating an identifier and a delay tolerant characteristic, wherein the identifier indicates delay tolerant traffic;
   receive, from a second apparatus, one or more packet data unit (PDUs), wherein each PDU, of the one or more PDUs, is associated with the identifier;
   buffer, based on the configuration information, the one or more PDUs; and
   send, based on the configuration information, the one or more PDUs.

2. The WTRU of claim 1, wherein the first apparatus comprises at least one of: a server, a network function, or a user equipment (UE).

3. The WTRU of claim 1, wherein the configuration information comprises at least one of: a type of endpoint for delay tolerant communication, an identity of an endpoint for delay tolerant communication, a delay tolerant data (DTD) information type, optimization services requested from a core network (CN), data path constraints, or communication scheduling information.

4. The WTRU of claim 1, wherein the second apparatus comprises a user equipment (UE).

5. The WTRU of claim 1, further configured to:
   send, to a user equipment (UE), second information to configure delay tolerant communications between the UE and a third apparatus, wherein the third apparatus comprises a remote device.

6. The WTRU of claim 1, further configured to:
   remove duplicate PDUs from the one or more PDUs.

7. The WTRU of claim 1, wherein the buffering aggregates the one or more PDUs into a data bundle.

8. The WTRU of claim 1, wherein the sending comprises identification of alternate downlink data paths.

9. The WTRU of claim 8, wherein the identification of alternate downlink data paths is based on one or more of: network resources, estimated endpoint trajectory, geographical information, communication scheduling, delay tolerant data (DTD) information type, or DTD capabilities.

10. The WTRU of claim 9, wherein the sending comprises transmission or retransmission of downlink PDUs of the one or more PDUs via the alternate downlink data paths identified.

11. The WTRU of claim 1, further configured to:
    send, to a third apparatus, second information to configure delay tolerant communications between the third apparatus and a remote device; and
    send, to the third apparatus, a request to page the remote device, wherein the request comprises a device identifier, a direct communication type, delay tolerance parameters, response notification types, a response aggregation type, and a paging payload.

12. The WTRU of claim 1, further configured to:
    send, to a third apparatus, second information to configure delay tolerant communications, comprising delay tolerant group broadcast or multicast services, between a user equipment (UE) and a remote device, wherein the UE is configured to monitor multicast communications based on communication identifiers, delay tolerance parameters and geographical information and wherein the UE is configured to route the multicast communications based on the second information.

13. The WTRU of claim 1, further configured to:
    determine an identity of a user equipment (UE) that is likely to receive a PDU of the one or more PDUs that has already been received; and
    send, to the UE, an indication that the PDU has been already received.

14. The WTRU of claim 1, further configured to:
    send, to the first apparatus, a partial acknowledgement; and
    send, to the first apparatus, an end-to-end acknowledgement.

15. A method for use in a wireless transmit/receive unit (WTRU) comprising a transceiver and one or more processors, the method comprising:
    receiving, from a first apparatus, configuration information indicating an identifier and a delay tolerant characteristic, wherein the identifier indicates delay tolerant traffic;
    receiving, from a second apparatus, one or more packet data unit (PDUs), wherein each PDU, of the one or more PDUs, is associated with the identifier;
    buffering, based on the configuration information, the one or more PDUs; and
    sending, based on the configuration information, the one or more PDUs.

16. The method of claim 15, wherein the first apparatus comprises at least one of: a server, a network function, or a user equipment (UE).

17. The method of claim 15, wherein the configuration information comprises at least one of: a type of endpoint for delay tolerant communication, an identity of an endpoint for delay tolerant communication, a delay tolerant data (DTD) information type, optimization services requested from a core network (CN), data path constraints, or communication scheduling information.

18. The method of claim 15, wherein the second apparatus comprises a user equipment (UE).

19. The method of claim 15, further comprising:
    removing duplicate PDUs from the one or more PDUs, or buffering of data bundles of the plurality of data bundles to enable aggregation of data bundles.

20. The method of claim 15, wherein the buffering aggregates the one or more PDUs into a data bundle.

* * * * *